(12) United States Patent
Yoo et al.

(10) Patent No.: US 9,837,919 B2
(45) Date of Patent: Dec. 5, 2017

(54) ELECTRIC POWER CONVERSION APPARATUS AND METHOD OF OPERATING THE SAME

(71) Applicant: LSIS CO., LTD., Gyeonggi-do (KR)

(72) Inventors: Anno Yoo, Gyeonggi-do (KR);
Young-Hoon Cho, Gyeonggi-do (KR);
Byeng-Joo Byen, Gyeonggi-do (KR)

(73) Assignee: LSIS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/166,042

(22) Filed: May 26, 2016

(65) Prior Publication Data

US 2016/0352236 A1    Dec. 1, 2016

(30) Foreign Application Priority Data

May 29, 2015    (KR) .......................... 10-2015-0076170

(51) Int. Cl.
*H02M 1/00* (2006.01)
*H02M 3/335* (2006.01)
(52) U.S. Cl.
CPC ............. *H02M 3/33584* (2013.01); *H02M 2001/0009* (2013.01)
(58) Field of Classification Search
CPC ............. H02M 3/33584; H02M 2001/0009
USPC ........................................................ 363/17
See application file for complete search history.

(56) References Cited

U.S. PATENT DOCUMENTS

| 9,197,135 B2 | 11/2015 | Matsubara et al. |
| 2011/0249472 A1 | 10/2011 | Jain et al. |
| 2011/0273136 A1* | 11/2011 | Yoshimoto ............. H02M 1/10 320/103 |
| 2013/0314950 A1 | 11/2013 | Hembach et al. |

(Continued)

FOREIGN PATENT DOCUMENTS

| JP | H8-107683 A | 4/1996 |
| JP | 2013-27201 A | 2/2013 |

(Continued)

OTHER PUBLICATIONS

Office Action dated Jul. 25, 2017 issued in corresponding Japanese Application No. 2016-103842.

*Primary Examiner* — Adolf Berhane
*Assistant Examiner* — Bart Iliya
(74) *Attorney, Agent, or Firm* — Nath, Goldberg & Meyer; Jerald L. Meyer; Stanley N. Protigal

(57) ABSTRACT

Some embodiments include an electric power conversion apparatus, which may include a transformer, a first converter connected to a primary side of the transformer, a second converter connected to a secondary side of the transformer, a first capacitor connected to the first converter, a second capacitor connected to the second converter, and a control unit for controlling the first converter and the second converter, wherein the control unit may determine operation ranges with respect to a plurality of modulation methods, may determine a modulation method including an output electric power value of the electric power conversion apparatus among the operation ranges of the plurality of modulation methods, and may output control signals of the first converter and the second converter based on the determined modulation method, wherein the control signals correspond to an instruction value.

13 Claims, 15 Drawing Sheets

(56) References Cited

U.S. PATENT DOCUMENTS

| | | | | |
|---|---|---|---|---|
| 2015/0349573 A1* | 12/2015 | Tschirhart | ............... | H02J 7/025 320/108 |
| 2016/0087545 A1* | 3/2016 | Higaki | .................. | H02J 7/0054 363/17 |
| 2016/0139651 A1* | 5/2016 | Schramm | .............. | G06F 1/3287 713/323 |
| 2016/0344297 A1* | 11/2016 | Lee | ................... | H02M 3/33592 |

FOREIGN PATENT DOCUMENTS

| | | |
|---|---|---|
| JP | 2013-179803 A | 9/2013 |
| JP | 2016-101089 A | 5/2016 |
| KR | 10-2014-0047523 A | 4/2014 |

\* cited by examiner

ELECTRIC POWER CONVERSION APPARATUS AND METHOD OF OPERATING THE SAME

CROSS REFERENCE TO RELATED APPLICATION

This application claims the benefit of Korean Patent Application No. 10-2015-0076170, filed on May 29, 2015, entitled "ELECTRIC POWER CONVERTION APPARATUS AND METHOD OF OPERATING THE SAME", which is hereby incorporated by reference in its entirety.

BACKGROUND

1. Technical Field

The present disclosure relates to an electric power conversion apparatus, and more particularly, to an electric power conversion apparatus capable of outputting a switching signal by applying a different modulation method according to an electric power output from an electric power conversion apparatus transmitting an electric power bidirectionally, and a method of operating the same.

2. Description of the Related Art

For the purpose of supplying energy to an electronic circuit requiring a relative high voltage or using energy in an application field in connection with a system, it may be necessary to boost an input voltage to a high voltage. In addition, depending on kinds of electronic circuits, it may be necessary to drop a voltage from a high level to a low level. A modeling and an analysis for a direct-current (DC) to DC (DC-DC) converter, which is one of various buck and step-down converters for such purposes, have been conducted.

A DC-DC converter may be roughly classified into an insulation type and a non-insulation type.

The insulation type has advantages capable of securing stability through insulation between an input end and an output end, that is, by implementing insulation through a transformer using a magnetic core, and controlling step-up and step-down ratios by adjusting a turn ratio.

As a kind of a DC-DC converter, a buck type converter includes a forward converter, a half bridge converter, a full bridge converter, and the like, and a buck-boost type converter includes a flyback converter and the like.

Meanwhile, a method for increasing an efficiency of an electric power conversion apparatus includes a soft switching technique. An electric power conversion apparatus modulates a voltage through an ON/OFF sequence control of an electric power semiconductor. To achieve a high efficiency of an electric power conversion apparatus, however, there is needed to reduce a switching loss occurring when an electric power semiconductor is turned on and off. For this purpose, a soft switching technique such as a zero voltage switching and a zero current switching is used.

A typical bidirectional electric power conversion apparatus includes a transformer, and a first converter and a second converter arranged at a primary side and a secondary side of the transformer, respectively.

Since the first converter and the second converter have a structure the same as each other, such a bidirectional electric power conversion apparatus is capable of bidirectionally controlling an electric power. Also, using the transformer arranged between the first and second converters, insulation may be implemented and an input/output ratio (a voltage step-up and step-down) may be changed.

At this point, the first converter and the second converter include a plurality of switching elements. A switching signal corresponding to one of a variety of modulation methods is supplied to the plurality of switching elements.

Here, the modulation method may be a phase shift modulation (PSM) method and a pulse width modulation (PWM) method, and the PWM method includes a single PWM method and a dual PWM method.

The PWM method is a method which performs modulation by setting 0.5 as a duty ratio of a switching signal of each of the first and second converters which are arranged at the primary side and the secondary side of the transformer, respectively.

The single PWM method is a method which varies a switching signal of one of the first and second converters using the PWM method, and modulates a switching signal of the other thereof by fixing a duty ratio of the switching signal to 0.5.

The dual PWM is a method which modulates a switching signal of each of the first and second converters using the PWM method.

As other example, a method using a voltage controller and a modulation method as one unit instead of separating them from each other may exist. In this case, an optimal modulation value may be extracted through a number of experiments and a map may be formed and used according to desired input and output voltage values using the optimal modulation value.

As described above, a method for generating a switching signal, which is provided in the typical electric power conversion apparatus, is classified into a phase control method, the PWM method, and an optimum modulation method.

The phase control method has disadvantages in which a safety problem may occur and an operation efficiency of a system may be lowered because a circulation current is increased when an output electric power is decreased or an input/output voltage ratio is increased.

And, in comparison with the phase control method, the PWM method has advantages of high efficiency and high performance, but it also has a disadvantage in which a control is complicated.

Typically, in the PWM method, a method for controlling a low electric power and a high electric power through a dual PWM method and a signal PWM method, respectively, for an operation of an electric power conversion apparatus is mainly proposed. In this case, since a variety of control variables such as a first switching signal, a second switching signal, and a phase difference therebetween are required for controlling the first converter and the second converter, there is a disadvantage in which a control operation is considerably complicated.

Here, the dual PWM method has a disadvantage in which high efficiency may not be obtained at a low electric power if an operation condition is not suitably satisfied.

Lastly, the optimum modulation method has disadvantages in which an acquiring of an optimized modulation value is difficult and a control operation is considerably complicated the same as that of the dual PWM method.

SUMMARY

It is an aspect of the present disclosure to provide an electric power conversion apparatus capable of providing a modulation method achieving a high efficiency in a wide operation range and also addressing a problem of a typical complicated closed-loop control method when an electric power conversion apparatus operates, and a method of operating the same.

Also, it is another aspect of the present disclosure to provide an electric power conversion apparatus capable of additionally providing a new modulation method when a modulation method is changed according to variation of an output electric power value, and a method of operating the same.

Technical problems to be solved by proposed embodiments disclosed herein are not limited to the technical problems described above, and another technical problem not mentioned above will be apparently understood by a person skilled in the art including these embodiments proposed from the following disclosure.

In an embodiment, an electric power conversion apparatus according to the present disclosure includes a transformer, a first converter connected to a primary side of the transformer and including a plurality of switching elements of a first leg and a plurality of switching elements of a second leg, a second converter connected to a secondary side of the transformer and including a plurality of switching elements of a third leg and a plurality of switching elements of a fourth leg, a first capacitor connected to the first converter, a second capacitor connected to the second converter, and a control unit configured to control the plurality of switching elements included in the first converter and the second converter, wherein the control unit determines operation ranges with respect to a plurality of modulation methods, determines a modulation method including an output electric power value of the electric power conversion apparatus among the operation ranges of the plurality of modulation methods, and outputs control signals of the first converter and the second converter based on the determined modulation method, wherein the control signals correspond to an instruction value.

Also, the first leg may include a first switching element and a second switching element, the second leg may include a third switching element and a fourth switching element, the third leg may include a fifth switching element and a sixth switching element, the fourth leg may include a seventh switching element and an eighth switching element.

In addition, the first leg may include a first switching element group including first and second switching elements connected in parallel with each other, and a second switching element group including third and fourth switching elements connected in parallel with each other; the second leg may include a third switching element group including fifth and sixth switching elements connected in parallel with each other, and a fourth switching element group including seventh and eighth switching elements connected in parallel with each other; the third leg may include a fifth switching element group including ninth and tenth switching elements connected in parallel with each other, and a sixth switching element group including eleventh and twelfth switching elements connected in parallel with each other; and the fourth leg may include a seventh switching element group including thirteenth and fourteenth switching elements connected in parallel with each other, and an eighth switching element group including fifteenth and sixteenth switching elements connected in parallel with each other.

Further, the control unit may include a controller configured to output a control variable corresponding to a voltage instruction value, a mode selector configured to output a select signal of one specific modulation method among the plurality of modulation methods based on the output electric power value, and a control signal output unit configured to output a first switching signal for controlling the first converter and a second switching signal for controlling the second converter by applying the modulation method selected through the mode selector based on the control variable output through the controller.

Additionally, the controller may include a first calculator configured to output a difference value between the voltage instruction value and an output voltage value, a proportional integral controller configured to perform a proportional integral on an output value of the first calculator to output the control variable, and a second calculator configured to output the output electric power value according to a product of the output voltage value and an output current value.

Moreover, the controller may further include a third calculator configured to receive an input voltage value and the output voltage value to calculate and output an input/output voltage ratio, wherein the mode selector may select the modulation method based on an operation condition according to the input/output voltage ratio output through the third calculator, and based on the output electric power value.

Also, the modulation method may include a first modulation method corresponding to a dual pulse width modulation method, a second modulation method corresponding to a triangular pulse width modulation method, a third modulation method corresponding to a single pulse width modulation method, and a fourth modulation method corresponding to a phase shift modulation (PSM) method, wherein the mode selector may store an operation range corresponding to each of the modulation methods, verify a modulation method in which the output electric power is included based on the stored operation range, and output a select signal of the verified modulation method.

Furthermore, the electric power value included in the operation range of each of the modulation methods may have a magnitude condition as follow: the first modulation method<the second modulation method<the third modulation method<the fourth modulation method.

In addition, the operation condition may include a step-up condition in which an output voltage is greater than an input voltage, and a step-down condition in which the output voltage is equal to or less than the input voltage, wherein the mode selector may separately store an operation range in the step-up condition and an operation range in the step-down condition by corresponding to each of the modulation methods.

Additionally, the control signal output unit may receive operation direction information of the electric power conversion apparatus, and output the first switching signal and the second switching signal using the received operation direction information, wherein the operation direction information may include a first direction operation condition in which a voltage is output from the first converter to the second converter, and a second direction operation condition in which the voltage is output from the second converter to the first converter.

Moreover, the control signal output unit may compare a currently selected modulation method with a previously applied modulation method, and adjust the received control variable if the current modulation method and the previous modulation method are different to each other.

Meanwhile, a method of operating an electric power conversion apparatus according to an embodiment, which includes a transformer, a first converter connected to a primary side of the transformer and including a plurality of switching elements of a first leg and a plurality of switching elements of a second leg, and a second converter connected to a secondary side of the transformer and including a plurality of switching elements of a third leg and a plurality of switching elements of a fourth leg, includes the steps of calculating an output electric power value using an output voltage value and an output current value of the electric power conversion apparatus; determining whether an operation condition of the electric power conversion apparatus is a step-down condition or a step-up condition using an input voltage value and the output voltage value of the electric power conversion apparatus; selecting a modulation method in which the output electric power value is included based on operation ranges of a plurality of modulation methods, each of which is classified according to the operation condition; performing a proportional integral on a difference value between a voltage instruction value and the output voltage value to output a control variable; and outputting a first switching signal of the first converter and a second switching signal of the second converter, which correspond to the output control variable, by applying the selected modulation method.

Also, the modulation method may include a first modulation method corresponding to a dual pulse width modulation method, a second modulation method corresponding to a triangular pulse width modulation method, a third modulation method corresponding to a single pulse width modulation method, and a fourth modulation method corresponding to a phase shift modulation (PSM) method, wherein the electric power value included in the operation range of each of the modulation methods may have a magnitude condition as follow: the first modulation method<the second modulation method<the third modulation method<the fourth modulation method.

Moreover, determining whether an operation direction condition of the electric power apparatus is a first direction operation condition or a second direction operation direction, wherein the first direction operation condition is a condition in which a voltage is output from the first converter to the second converter, and the second direction operation condition is a condition in which the voltage is output from the second converter to the first converter may be further included, wherein the outputting of the first switching signal of the first converter and the second switching signal of the second converter may include outputting the first and second switching signals to the first converter and the second converter according to the determined operation condition.

Additionally, comparing a currently selected modulation method with a previously applied modulation method prior to the outputting of the first and second switching signals; and adjusting the received control variable if the current modulation method and the previous modulation method are different to each other may further included.

The electric power conversion apparatus according to an embodiment of the present disclosure changes a modulation method of a switching signal according to an output electric power value. Consequently, a problem of a typical complicated closed-loop control method may be addressed and also an electric power may be delivered in a wider voltage range. In addition, high electric power conversion efficiency may be obtained over a wide voltage range.

Moreover, the electric power conversion apparatus according to the embodiment of the present disclosure changes a modulation method of a switching signal according to an output electric power value, and a control variable according to the changed modulation method. As a result, a problem in which values of an output voltage and an output current are abruptly varied according to the changed of the modulation method may be addressed.

DETAILED DESCRIPTION

Figure 1:
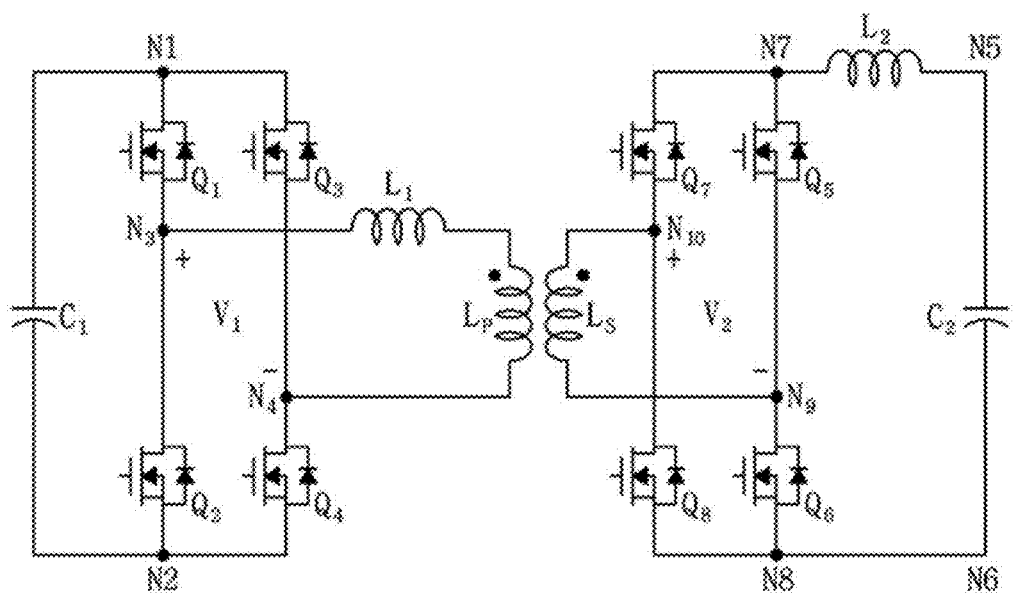
FIG. 1 is a circuit diagram of an electric power conversion apparatus according to an embodiment of the present disclosure.

Advantages and features of the present disclosure and methods of accomplishing the same may be understood more readily with reference to the following description of exemplary embodiments and the accompanying drawings. However, the present disclosure is not limited to the embodiments set forth herein, and it will be implemented in different types. Also, these embodiments are provided to completely describe the present disclosure, and to teach a person skilled in the art by fully conveying the concept of the disclosure, and the present disclosure will only be defined by the appended claims. The same reference numerals throughout the specification refer to the same elements.

In the following description of the present disclosure, if a detailed description of known functions and configurations is determined to obscure the interpretation of embodiments of the present disclosure, the detailed description thereof will be omitted. And, all terms used hereinafter are selected by considering a function in an embodiment, and meanings thereof may be different according to the intent or custom of a user and an operator. Therefore, the meanings of the terms used in the following embodiments should follow detailed definitions disclosed herein if any.

The present disclosure is described below with reference to flowchart illustrations of methods, apparatus (systems), and computer program products according to an embodiment of the disclosure. It will be understood that each block of the flowchart illustrations, and combinations of blocks in the flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

In addition, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

Circuit Diagram of Electric Power Conversion Apparatus

FIG. 1 is a circuit diagram of an electric power conversion apparatus according to an embodiment of the present disclosure.

With reference to FIG. 1, a connection relationship of circuit elements configuring the electric power conversion apparatus according to the embodiment of the present disclosure will be described.

The electric power conversion apparatus according to the embodiment of the present disclosure includes a transformer provided with first and second coils $L_p$ and $L_s$ and a primary circuit and a secondary circuit arranged at left and right sides of the first and second coils $L_p$ and $L_s$ of the transformer.

Here, the primary circuit and the secondary circuit mean a first converter and a second converter, respectively, and have the same structure as each other.

That is, the primary circuit may include a first capacitor $C_1$, a first inductor $L_1$, and switching elements $Q_1$ to $Q_4$ configuring a full bridge circuit on a primary side. Also, the secondary circuit may include a second capacitor $C_2$, a second inductor $L_2$, and switching elements $Q_5$ to $Q_8$ configuring a full bridge circuit on a secondary side.

At this point, such an electric power conversion apparatus operates bidirectionally.

In other words, the electric power conversion apparatus may be operated in a first direction operation (a forward direction operation) in which an electric power is input to the primary circuit and then the electric power is output to the primary circuit through the transformer T. Otherwise, on the contrary to the first direction operation, the electric power conversion apparatus may be operated in a second direction operation (a reverse direction operation) in which an electric power is input to the secondary circuit and then the electric power is output to the primary circuit through the transformer T.

In the primary side circuit, the first capacitor $C_1$ is connected between first and second nodes $N_1$ and $N_2$, and the first inductor $L_1$ is connected to a third node $N_3$ and one terminal of the first coil $L_p$. And, the first coil $L_p$ is connected between the first inductor $L_1$ and a fourth node $N_4$.

Also, the full bridge circuit of the primary side is configured with a first leg and a second leg between the first and second nodes $N_1$ and $N_2$. The first leg is configured with the first switching element $Q_1$ connected between the first and second nodes $N_1$ and $N_3$, and the second switching element $Q_2$ connected between the third and second nodes $N_3$ and $N_2$. And, the second leg is configured with the third switching element $Q_3$ connected between the first and fourth nodes $N_1$ and $N_4$, and the fourth switching element $Q_4$ connected between the fourth and second nodes $N_4$ and $N_2$.

In the secondary side circuit, the second capacitor $C_2$ is connected between fifth and sixth nodes $N_5$ and $N_6$, and the second inductor $L_2$ is connected between the fifth node $N_5$ and a seventh node and $N_7$. And, the second coil $L_s$ is connected between tenth and ninth nodes $N_{10}$ and $N_9$.

Also, a full bridge circuit of the secondary side is configured with a third leg and a fourth leg between the seventh node and an eighth node $N_7$ and $N_8$. The third leg is configured with the fifth switching element $Q_5$ connected between the seventh and ninth nodes $N_7$ and $N_9$, and the sixth switching element $Q_6$ connected between the ninth and eighth nodes $N_9$ and $N_8$. And, the fourth leg is configured with the seventh switching element $Q_7$ connected between the seventh node $N_7$ and a tenth node $N_{10}$, and the eighth switching element $Q_8$ connected between the tenth and eighth nodes $N_{10}$ and $N_8$.

The electric power conversion apparatus according to the embodiment of the present disclosure is a bidirectional converter. That is, in the first direction operational mode (the forward direction operational mode), the electric power conversion apparatus steps-up or steps-down a DC input voltage at the first and second nodes $N_1$ and $N_2$ to output a DC output voltage to the fifth and sixth nodes $N_5$ and $N_6$. And, in the second direction operational mode (the reverse direction operational mode), the electric power conversion apparatus steps-up or steps-down a DC input voltage at the fifth and sixth nodes $N_5$ and $N_6$ to output a DC output voltage to the first and second nodes $N_1$ and $N_2$.

Hereinafter, for convenience of description, it will be described that the first direction operational mode performs a step-down operation according to a number of turns of each of the primary side and the secondary side of the transformer $L_p$ and $L_s$ and the second direction operational mode performs a step-up operation according to a number of turns of each of the primary side and the secondary side of the transformer $L_p$ and $L_s$. However, it is merely one embodiment, and thus a step-down operation and a step-up operation may be performed together according to an adjustment of a number of turns of the transformer $L_p$ and $L_s$ in the first direction operational mode, and otherwise, the step-down operation and the step-up operation may be performed together in the second direction operational mode.

Also, the first direction operational mode and the second direction operational mode of the electric power conversion apparatus according to a dual PWM modulation method among various modulation methods will be described below.

First Direction Operational Mode

Hereinafter, with reference to FIGS. 2 to 6, the first direction operational mode will be described.

Figure 2:
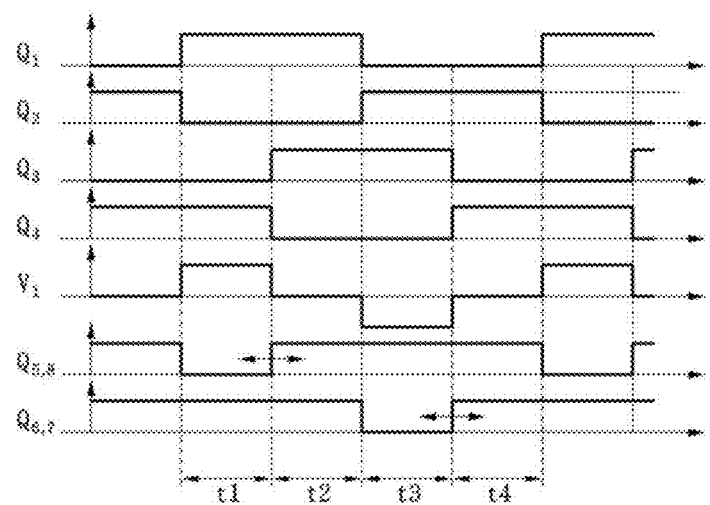
FIG. 2 is a timing diagram when the electric power conversion apparatus of FIG. 1 operates in a first direction, according to an embodiment of the present disclosure.

FIG. 2 is a timing diagram in the first direction operational mode, and FIGS. 3 to 6 are diagrams illustrating operations of the electric power conversion apparatus according to a timing of FIG. 2.

The first and second switching elements $Q_1$ and $Q_2$ of the first leg operate complimentarily, so that, if one of them is turned on, the other thereof is turned off. And, the third and fourth switching elements $Q_3$ and $Q_4$ of the second leg also operate complementarily, so that, if one of them is turned on, the other thereof is turned off.

Alternatively, the switching elements $Q_1$ to $Q_4$ may operate in a phase shifted switching method in which the third switching element $Q_3$ is turned on after the first switching element $Q_1$ has been turned on and then a predetermined time passes, and the fourth switching element $Q_4$ is turned on after the second switching element $Q_2$ has been turned on and then a predetermined time passes. In addition, the fifth and eighth switching elements $Q_5$ and $Q_8$ may be simultaneously turned on and off, and the sixth and seventh switching elements $Q_6$ and $Q_7$ may be simultaneously turned on and off.

First Time Period t1

Figure 3:
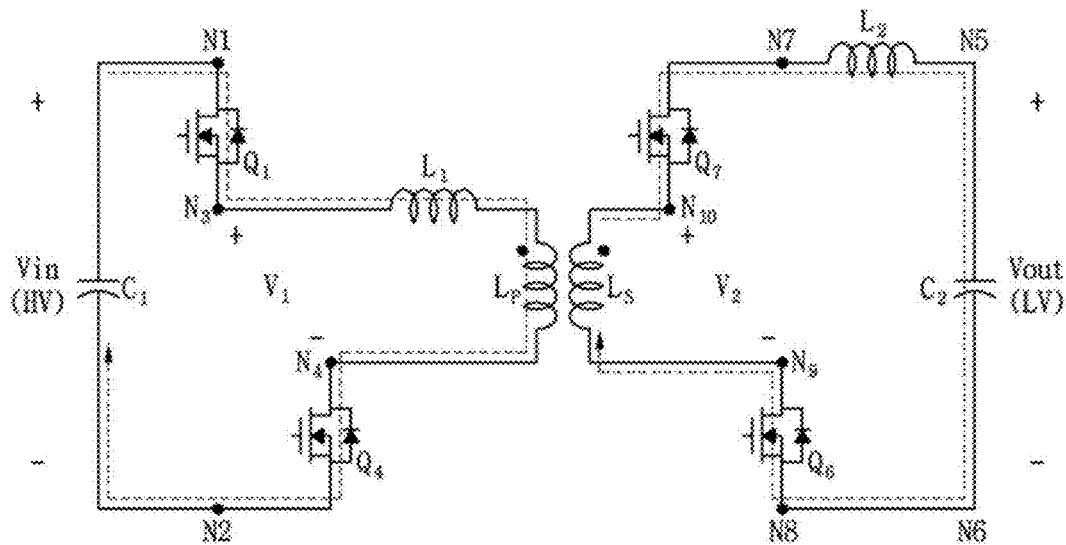
FIGS. 3 to 6 are diagrams illustrating an operation of the electric power conversion apparatus according to a timing of FIG. 2, according to an embodiment of the present disclosure.

With reference to FIGS. 2 and 3, during a first time period t1, the first and fourth switching elements $Q_1$ and $Q_4$ are turned on, and the second and third switching elements $Q_2$ and $Q_3$ are turned off.

And, the fifth and eight switching elements $Q_5$ and $Q_8$ are turned off, and the sixth and seventh switching elements $Q_6$ and $Q_7$ are turned on.

At this point, as shown in a dotted line of the primary side, a primary side current sequentially flows along the first switching element $Q_1$, the third node $N_3$, the fourth node $N_4$, the fourth switching element $Q_4$, and the second node $N_2$.

At this point, the first inductor $L_1$ performs a charge operation and thus a first voltage $V_1$ has a positive voltage.

The transformer $L_p$ and $L_s$ forms a secondary side current on the secondary side based on the primary side current and the turns ratio.

The secondary side current flows along the seventh switching element $Q_7$, the seventh node $N_7$, the second inductor $L_2$, the second capacitor $C_2$, and the sixth switching element $Q_6$. And, the secondary side current charges the second inductor $L_2$ such that the second inductor $L_2$ accumulates energy.

Second Time Period t2

Figure 4:
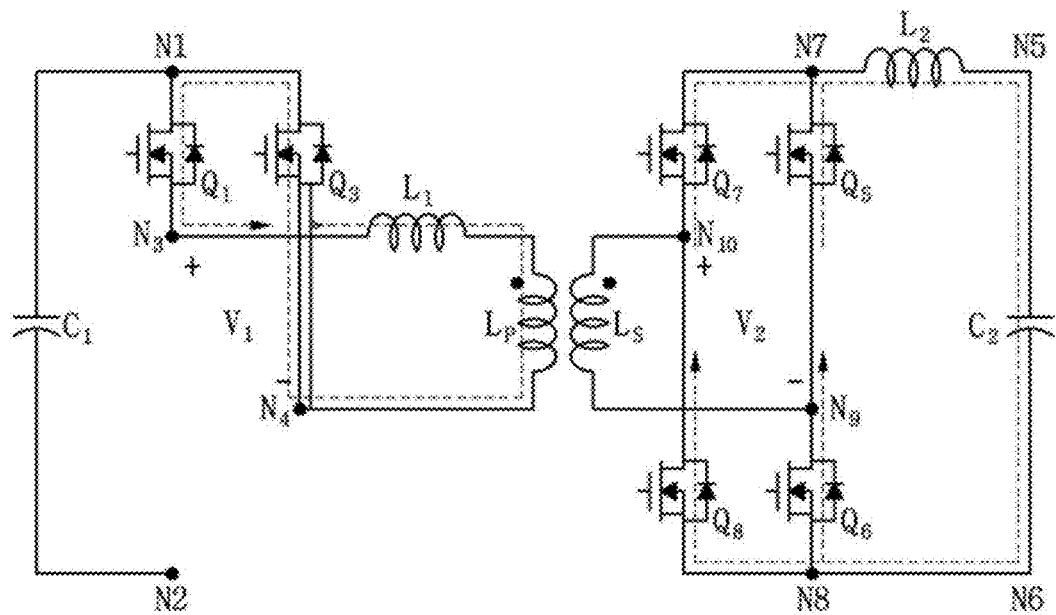

With reference to FIGS. 2 and 4, during a second time period t2, the first switching element $Q_1$ is maintained in a turn on state, whereas the fourth switching element $Q_4$ is turned off. And, the third switching element $Q_3$, which was turned off during the first time period t1, is turned on.

And, the second switching element $Q_2$ is maintained in a turn off state. In addition, the switching elements $Q_5$ to $Q_8$ on the secondary side are turned on. In this case, since the first and third switching elements $Q_1$ and $Q_3$ form a current path of the primary side, the third and fourth nodes are disconnected from each other, so that the first voltage $V_1$ becomes zero. And, since the switching elements $Q_5$ to $Q_8$ on the secondary side are turned on, the second voltage $V_2$ also becomes zero and the accumulated energy on the second inductor $L_2$ is delivered to an output terminal $N_5$-$N_6$.

Third Time Period t3

With reference to FIGS. 2 and 4, during a third time period t3, the first and fourth switching elements $Q_1$ and $Q_4$ are turned off, and the second and third switching elements $Q_2$ and $Q_3$ are turned on.

And, the fifth and eighth switching elements $Q_5$ and $Q_8$ are turned on, and the sixth and seventh switching elements $Q_6$ and $Q_7$ are turned off.

At this point, as shown in a dotted line on the primary side, a primary side current sequentially flows along the third switching element $Q_3$, the fourth node $N_4$, the third node $N_3$, and the second switching element $Q_2$. That is, the primary side current flows in a reverse direction compared to a flow direction of the primary side current during the first time period.

And, the first inductor $L_1$ is charged by the primary side current and the first voltage $V_1$ has a negative voltage. The primary side current is delivered to the secondary side by the transformer $L_p$ and $L_s$.

In addition, the secondary side current flows along the fifth switching element $Q_5$, the second inductor $L_2$, the second capacitor $C_2$, and the eighth switching element $Q_8$. At this point, the secondary side current charges the second inductor $L_2$ so that the second inductor $L_2$ accumulates energy.

Fourth Time Period t4

Figure 5:
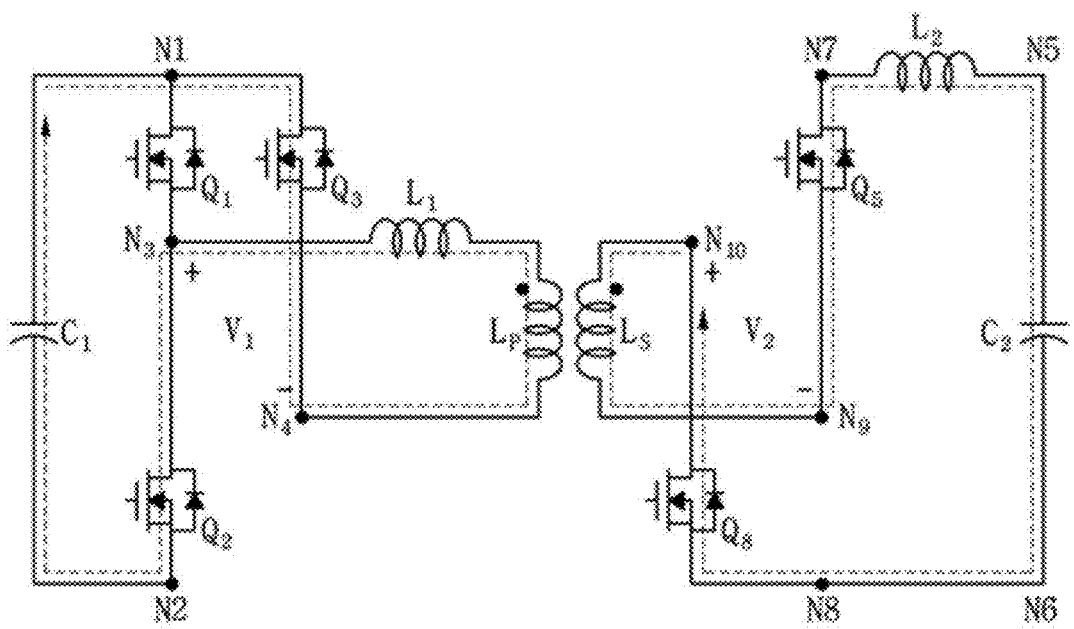
Figure 6:
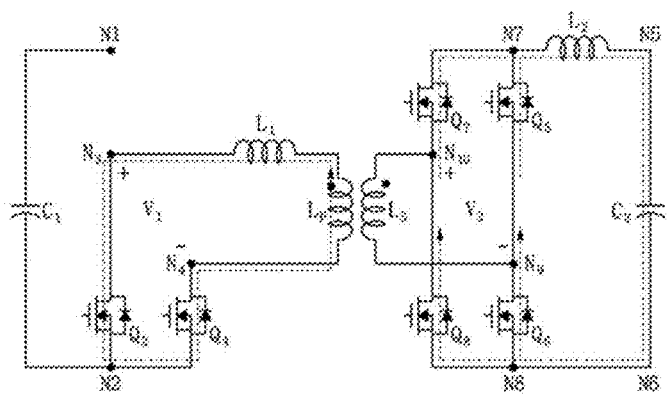

With reference to FIGS. 2 and 5, during a fourth time period t4, the second switching element $Q_2$ is maintained in a turn on state, whereas the third switching element $Q_3$ is turned off. And, the fourth switching element $Q_4$, which was in a turn off state during the third time period t3, is turned on.

In addition, the first switching element $Q_1$ is maintained in a turn off state. And, the switching elements $Q_5$ to $Q_8$ on the secondary side are turned on.

In this case, since the second and fourth switching elements $Q_2$ and $Q_4$ form a current path of the primary side, the third and fourth nodes $N_3$ and $N_4$ are disconnected to each other so that the first voltage $V_1$ becomes zero.

And, the switching elements $Q_5$ to $Q_8$ on the secondary side are turned on such that the second voltage $V_2$ also becomes zero and the accumulated energy on the second inductor $L_2$ is delivered to the output terminal $N_5$-$N_6$.

With a periodic repetition of the aforementioned operation, an input voltage HV on an input terminal $N_1$-$N_2$ is stepped down through the transformer $L_p$ and $L_s$ and an output voltage LV is output to the output terminal $N_5$-$N_6$.

Meanwhile, the turns ratio of the transformer $L_p$ and $L_s$ is determined according to the input voltage HV, the output voltage LV, and a duty ratio, and an inductance of the second inductor $L_2$ and a capacitance of the second capacitor $C_2$ are determined based on a ripple magnitude of an output current and an output voltage.

Second Direction Operational Mode

Hereinafter, with reference to FIGS. 7 to 11, a second direction operational mode will be described.

Figure 7:
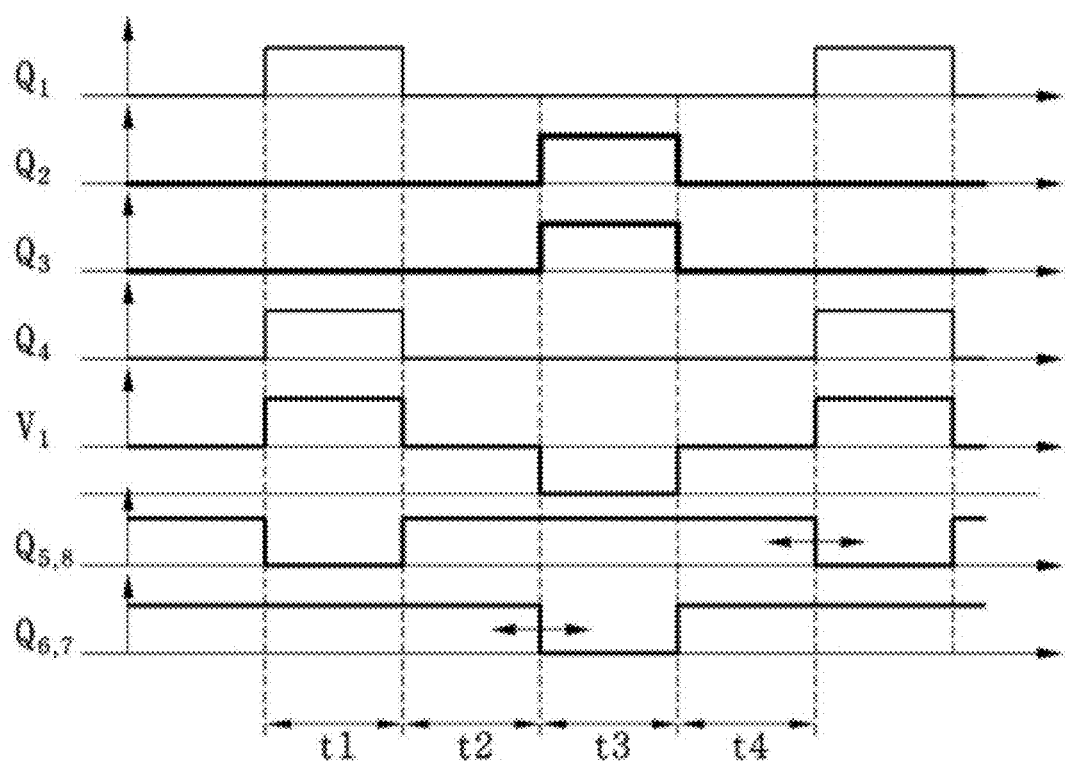
FIG. 7 is a timing diagram when the electric power conversion apparatus of FIG. 1 operates in a second direction, according to an embodiment of the present disclosure.

FIG. 7 is a timing diagram in the second direction operational mode, and FIGS. 8 to 11 are diagrams illustrating operations according to a timing of FIG. 7.

First Time Period t1

Figure 8:
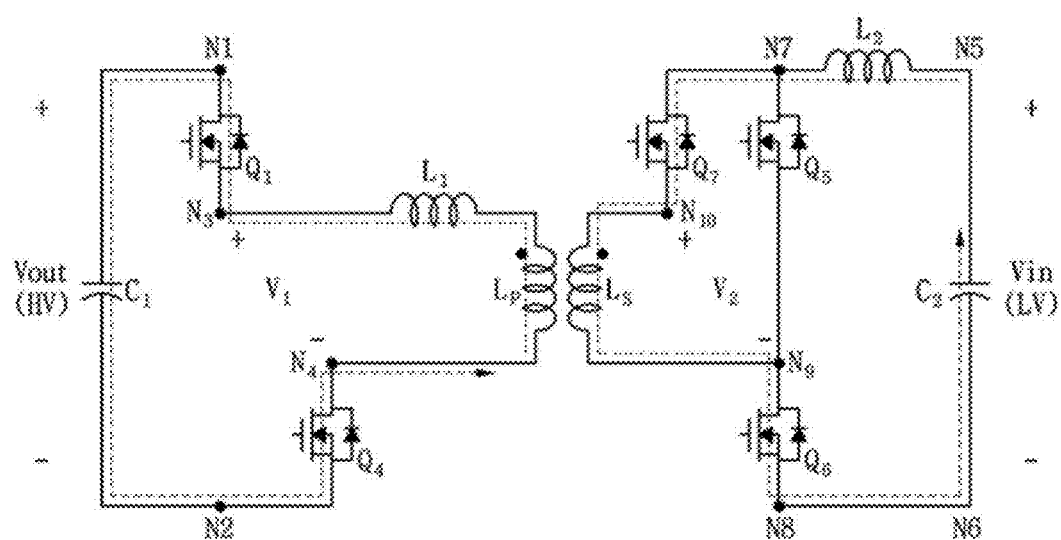
FIGS. 8 to 11 are diagrams illustrating an operation of the electric power conversion apparatus according to a timing of FIG. 7, according to an embodiment of the present disclosure.

With reference to FIGS. 7 and 8, during a first time period t1, the first and fourth switching elements $Q_1$ and $Q_4$ are turned on, and the second and third switching elements $Q_2$ and $Q_3$ are turned off.

And, the fifth and eighth switching elements $Q_5$ and $Q_8$ are turned off, and the sixth and seventh switching elements $Q_6$ and $Q_7$ are turned on. In this case, a current from the second capacitor $C_2$ on the secondary side flows along the second inductor $L_2$, the seventh switching element $Q_7$, the second coil $L_s$ and the sixth switching element $Q_6$ so that the second voltage $V_2$ becomes a positive voltage.

At this point, a current of the secondary side forms a current of the primary side according to the turns ratio of the transformer $L_p$ and $L_s$ and the current from the first coil $L_p$ of the primary side flows along the first inductor $L_1$, the first switching element $Q_1$, the first capacitor $C_1$, and the fourth switching element $Q_4$ to charge the first capacitor $C_1$.

Second Time Period t2

Figure 9:
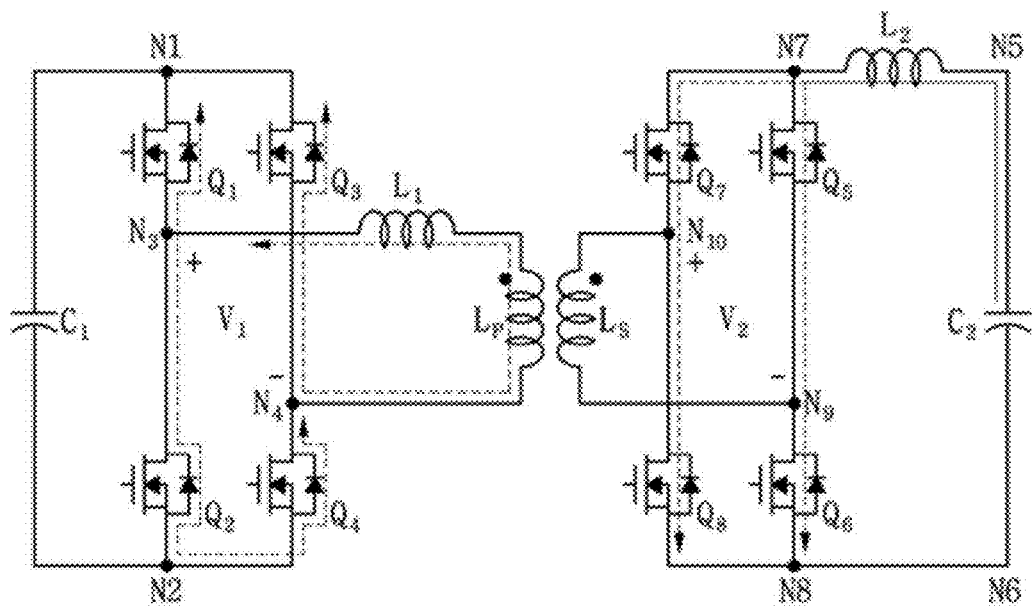

With reference to FIGS. 7 and 9, during a second time period t2, the first and fourth switching elements $Q_1$ and $Q_4$ are turned off, and the second and third switching elements $Q_2$ and $Q_3$ are maintained in a turn off state.

And, the fifth and eighth switching elements $Q_5$ and $Q_8$ are turned on, and the sixth and seventh switching elements $Q_6$ and $Q_7$ are maintained in a turn on state. In this case, since the fifth to eighth switching elements $Q_5$, $Q_6$, $Q_7$, and $Q_8$ are turned on, the second voltage $V_2$ becomes zero, a voltage induced to the first coil $L_p$ of the primary side becomes 0 volts (V), and a current flowing at the first inductor $L_1$ flows to the first capacitor $C_1$ via an anti-parallel diode of each of the first to fourth switching elements $Q_1$, $Q_2$, $Q_3$, and $Q_4$. And, the current flowing at the second coil $L_s$ is decreased to become a reverse current in a next time period.

Third Time Period t3

Figure 10:
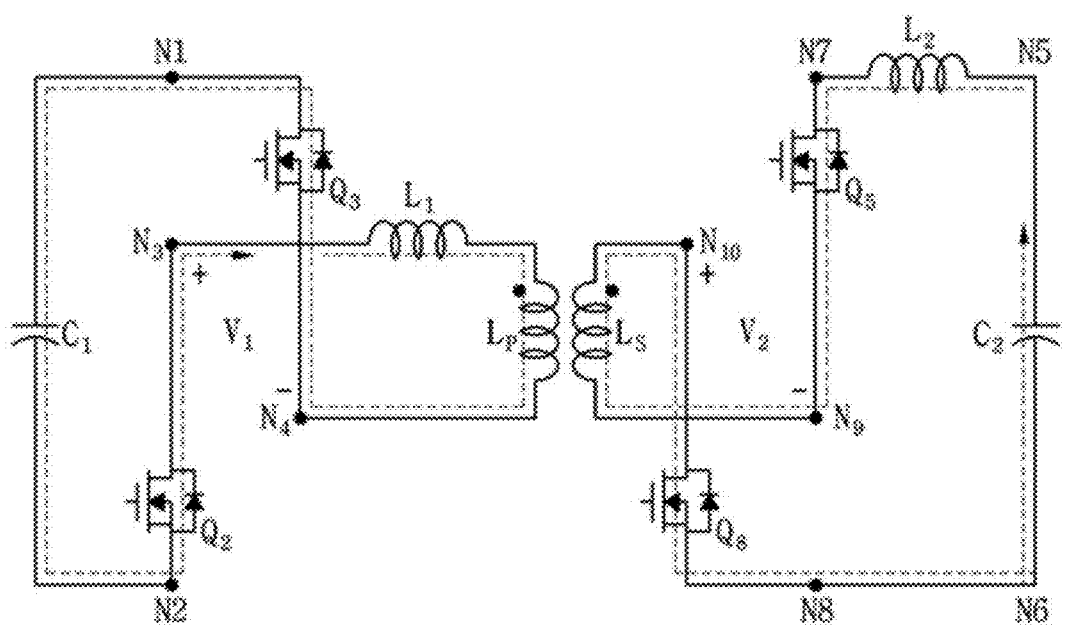

With reference to FIGS. 7 and 10, during a third time period t3, the first and fourth switching elements $Q_1$ and $Q_4$ are maintained in a turn off state, and the second and third switching elements $Q_2$ and $Q_3$ are turned on.

And, the fifth and eighth switching elements $Q_5$ and $Q_8$ are maintained in a turn on state, and the sixth and seventh switching elements $Q_6$ and $Q_7$ are turned off.

In this case, a current from the second capacitor $C_2$ on the secondary side flows along the second inductor $L_2$, the fifth switching element $Q_5$, the second coil $L_s$ and the eighth switching element $Q_8$, and the second voltage $V_2$ becomes a negative voltage.

At this point, the current from the first coil $L_p$ on the primary side flows through the first inductor $L_1$, the third switching element $Q_3$, the first capacitor $C_1$, and the second switching element $Q_2$ by the transformer $L_p$ and $L_s$ to charge the first capacitor $C_1$.

Fourth Time Period t4

Figure 11:
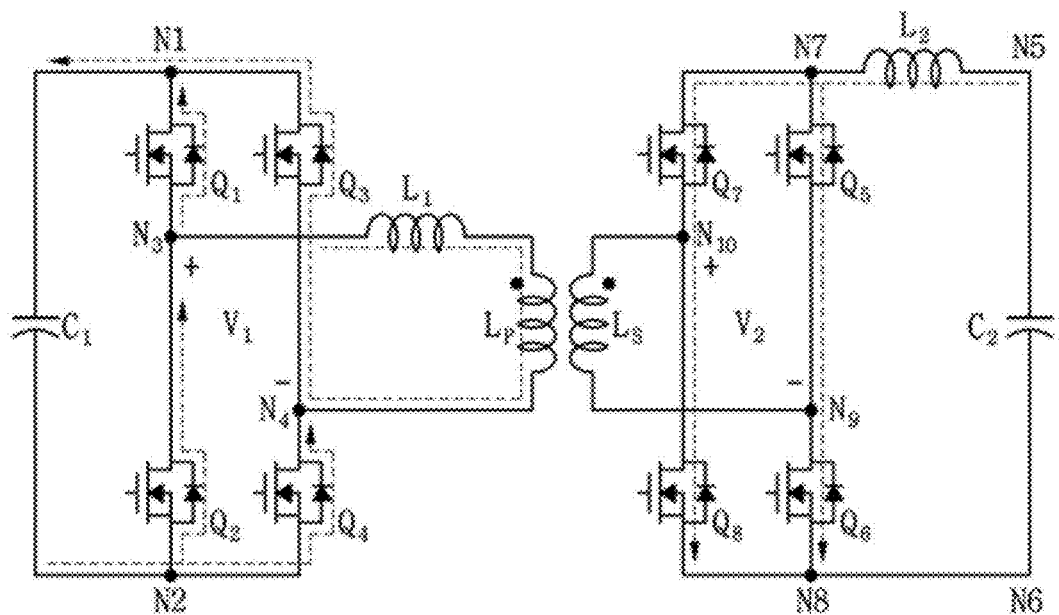

With reference to FIGS. 7 and 11, during a fourth time period t4, the first and fourth switching elements $Q_1$ and $Q_4$ are maintained in a turn off state, and the second and third switching elements $Q_2$ and $Q_3$ are turned off.

And, the fifth and eighth switching elements $Q_5$ and $Q_8$ are maintained in a turn on state, the sixth and seventh switching elements $Q_6$ and $Q_7$ are turned off. In this case, since the fifth to eighth switching elements $Q_5$, $Q_6$, $Q_7$, and $Q_8$ are turned on, the second voltage $V_2$ becomes zero, a voltage induced to the first coil $L_p$ on the primary side becomes 0 V, and a current flowing at the first inductor $L_1$ flows to the first capacitor $C_1$ via the anti-parallel diode of each of the first to fourth switching elements $Q_1$, $Q_2$, $Q_3$, and $Q_4$.

In addition, the current flowing at the second coil $L_s$ is decreased to become a forward current in a next time period.

With a periodic repetition of the aforementioned operation, an input voltage LV at an input terminal $N_5$-$N_6$ is stepped up through the transformer $L_p$ and $L_s$ and an output voltage HV is output to an output terminal $N_1$-$N_2$.

Meanwhile, according to arrows of FIG. 7, when a turn off timing of each of the fifth and eighth switching elements $Q_5$ and $Q_8$, which were turned on, is adjusted, that is, a time of each of the fifth and eighth switching elements $Q_5$ and $Q_8$ maintained in a turn on state is increased, an amount of charge of the first capacitor $C_1$ on the primary side may be increased by increasing an amount of a current flowing at the second coil $L_s$.

Similarly, when a turn off timing of each of the sixth and seventh switching elements $Q_6$ and $Q_7$, which were turned on, that is, a time of each of the sixth and seventh switching elements $Q_6$ and $Q_7$ maintained in a turn on state, an amount of charge of the first capacitor $C_1$ on the primary side may be increased by increasing an amount of a current flowing at the second coil $L_s$.

Using such a principle, the output voltage HV higher than the input voltage LV may be output to the output terminal $N_1$-$N_2$ by adjusting an amount of amplification of the input voltage LV.

Figure 12:
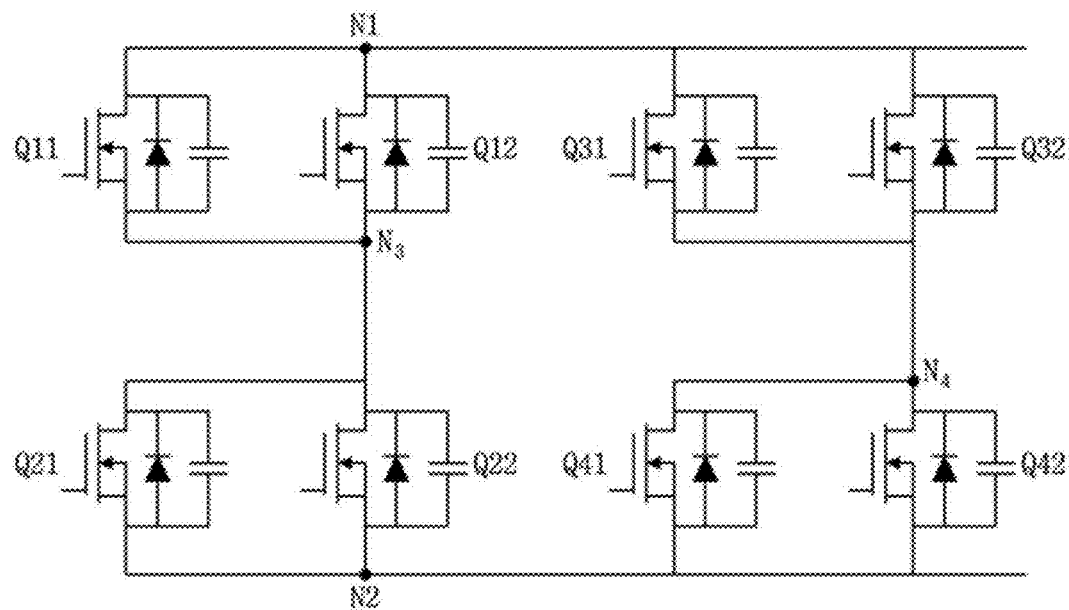
FIG. 12 is a diagram illustrating another configuration example of switching elements configuring a primary side circuit and a secondary side circuit in the electric power conversion apparatus shown in FIG. 1, according to an embodiment of the present disclosure.

FIG. 12 is a diagram illustrating another configuration example of switching elements configuring the primary side circuit and the secondary side circuit in the electric power conversion apparatus shown in FIG. 1.

FIG. 12 is a diagram illustrating another configuration example of switching elements included in the first side circuit in FIG. 1.

Firstly, the primary side circuit shown in FIG. 1 is configured with the first leg and the second leg between the first and second nodes $N_1$ and $N_2$. The first leg is configured with the first switching element $Q_1$ connected between the first and third nodes $N_1$ and $N_3$, and the second switching element $Q_2$ connected between the third and second nodes $N_3$ and $N_2$. And, the second leg is configured with the third switching element $Q_3$ connected between the first and fourth nodes $N_1$ and $N_4$, and the fourth switching element $Q_4$ connected between the fourth and second nodes $N_4$ and $N_2$.

On the other hand, a full bridge circuit of a primary side circuit shown in FIG. 12 is configured with a first leg and a second leg between first and second nodes $N_1$ and $N_2$.

The first leg is configured with a first switching element group connected between the first node $N_1$ and a third node $N_3$, and a second switching element group connected between the third and second nodes $N_3$ and $N_2$.

Here, the first switching element group includes a 1-1 switching element $Q_{11}$ and a 1-2 switching element $Q_{12}$ connected in parallel with each other between the first and third nodes $N_1$ and $N_3$. And, the second switching element group includes a 2-1 switching element $Q_{21}$ and a 2-2 switching element $Q_{22}$ connected in parallel with each other between the third and second nodes $N_3$ and $N_2$.

The second leg is configured with a third switching element group connected between the first and fourth nodes $N_1$ and $N_4$, and a fourth switching element group connected between the fourth and second nodes $N_4$ and $N_2$.

Here, the third switching element group includes a 3-1 switching element $Q_{31}$ and a 3-2 switching element $Q_{32}$ connected in parallel with each other between the first and fourth nodes $N_1$ and $N_4$. And, the fourth switching element group includes a 4-1 switching element $Q_{41}$ and a 4-2 switching element $Q_{42}$ connected in parallel with each other between the fourth and second nodes $N_4$ and $N_2$.

In addition, although the hull bridge circuit of the primary side circuit has been described above, a full bridge circuit of the secondary side circuit including a configuration the same as that of the full bridge circuit of the primary side circuit may be configured.

Control Operation

Figure 13:
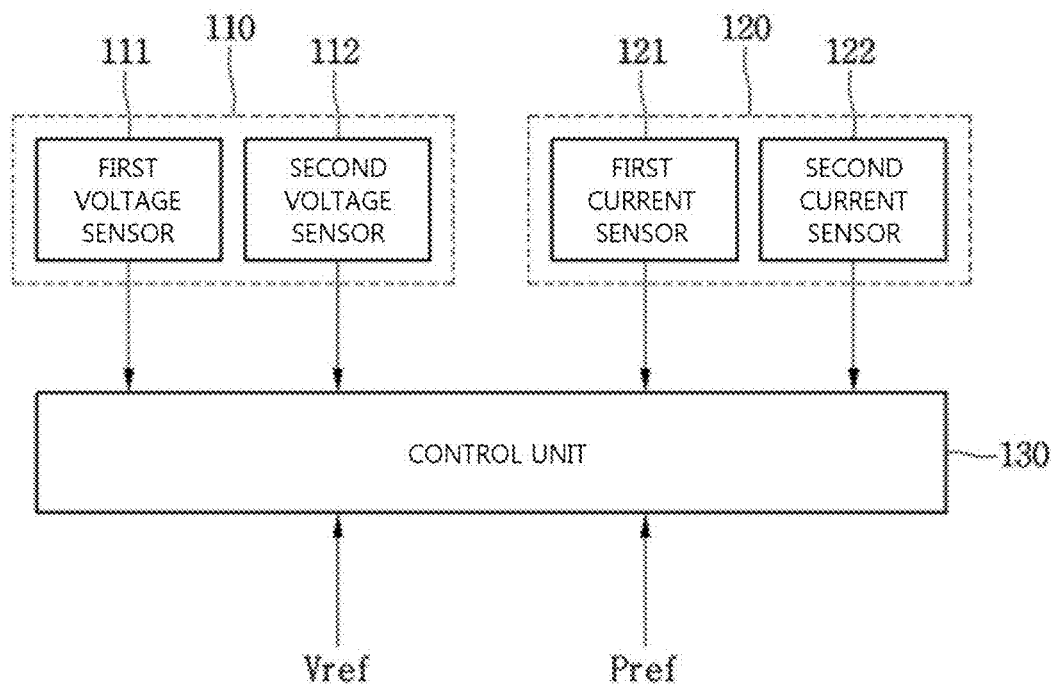
FIG. 13 is a block diagram of a control system for outputting a switching signal according to an embodiment of the present disclosure.
Figure 14:
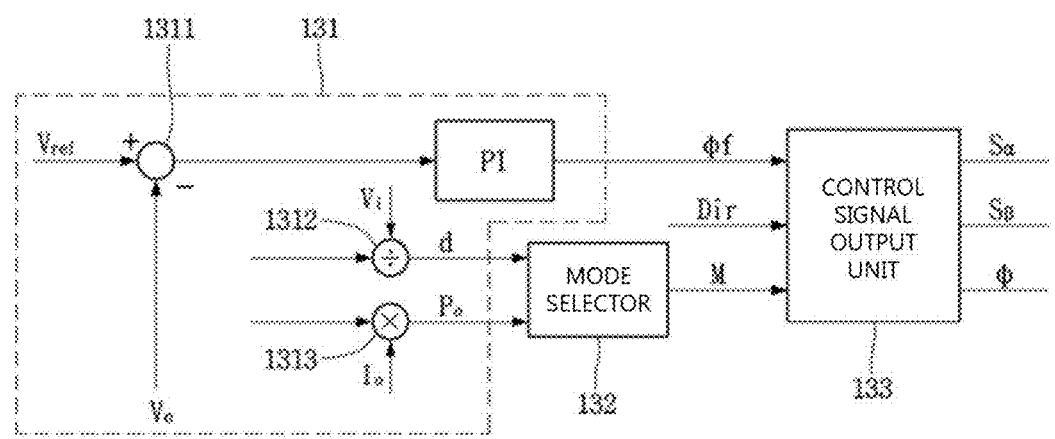
FIG. 14 is a circuit diagram of one example implementing a controller of FIG. 13, according to an embodiment of the present disclosure.

FIG. 13 is a block diagram of a control system for outputting a switching signal according to an embodiment of the present disclosure, and FIG. 14 is a circuit diagram of one example implementing a controller of FIG. 13.

With reference to FIG. 13, a control system includes a voltage sensor 110, a current sensor 120, and a control unit 130.

The voltage sensor 110 includes a first voltage sensor 111 and a second voltage sensor 112.

The first voltage sensor 111 is disposed at an input end of the primary side circuit to detect a voltage of a position at which the first voltage sensor 111 is disposed. That is, in the first direction operational mode, the first voltage sensor 111 may detect an input voltage $V_i$, of the electric power conversion apparatus.

The second voltage sensor 112 is disposed at an output end of the secondary side circuit to detect a voltage at a position at which the second voltage sensor 112 is disposed. That is, in the second direction operational mode, the second voltage sensor 112 may detect an output voltage of the electric power conversion apparatus.

The current sensor 120 includes a first current sensor 121 and a second current sensor 122.

The first current sensor 121 is disposed at the input end of the primary side circuit to detect a current at a position at which the first current sensor 121 is disposed. That is, in the first direction operational mode, the first current sensor 121 may detect an input current Ii of the electric power conversion apparatus.

The second current sensor 122 is disposed at the output end of the secondary side circuit to detect a current at a position at which the second current sensor 122 is disposed. That is, in the second direction operational mode, the second current sensor 122 may detect an output current $I_o$ of the electric power conversion apparatus.

The control unit 130 determines an operational mode of the electric power conversion apparatus according to a variety of conditions. The operational mode includes the first direction operational mode and the second direction operation mode, which are described above.

That is, the electric power conversion apparatus may be installed at a grid connection apparatus.

Therefore, in the first direction operational mode, an electrical energy generation device (for example, a photovoltaic power generation device, a wind power generation device, a thermal power generation device, and the like) is connected to the input end of the primary side circuit, so that the electric power conversion apparatus may convert electric power supplied from the electrical energy generation device connected thereto and supply the converted electric power to an energy storing device connected to the output end of the secondary side circuit, thereby charging the energy storing device.

And, in the second direction operational mode, a discharge of the energy storing device is performed, so that the electric power conversion apparatus may supply electric power output from the energy storing device due to the discharge thereof to a grid connection or a load connected to the input end of the primary side circuit.

Consequently, the control unit 130 determines an operational mode of the electric power conversion apparatus (that is, an operation direction of the electric power conversion apparatus) according to a variety of conditions (for example, an amount of load, an amount of charge of an energy storing device, and the like).

And, the control unit 130 generates a switching signal (hereinafter, a switching signal supplied to the primary side circuit is referred to as a 'first switching signal,' and a switching signal supplied to the secondary side circuit is referred to as a 'second switching signal.') supplied to each of the first side circuit and the second side circuit according to an instruction value supplied from an external side.

For this purpose, the control unit 130 calculates and outputs a control variable Del in order to generate the first switching signal and the second switching signal according to the instruction value. The control variable Del is $\Phi_f$ shown in FIG. 14.

The control variable Del is a control condition for obtaining a desired output electric power, and includes a phase and a duty ratio of each of the first switching signal and the second switching signal.

In other words, an output electric power value may be determined by the first switching signal and the second switching signal according to a phase and a duty ratio thereof determined by the control variable.

Also, the control unit 130 determines a voltage modulation method for generating the first switching signal and the second switching signal according to the control variable.

Here, the voltage modulation method includes a first modulation method, a second modulation method, a third modulation, and a fourth modulation method.

The first modulation method means a dual PWM method.

The dual PWM method is a method modulating the first and second switching signals by applying a PWM method. Therefore, duty ratios of the first switching signal and the second switching signal are to be varied instead of being fixed.

The second modulation method means a triangular PWM method.

The triangular PWM method is a method in which a duty ratio of one of the first and second switching signals is varied and a duty ratio of the other thereof is set to 0.5. This is a modulation method in which a current becomes 0 at a time when a voltage waveform of the transformer $L_p$ and $L_s$ is changed (from a positive to negative, or from a negative to a positive).

The third modulation method means a single PWM method.

Similar to the triangular PWM method, the single PWM method is a method in which a duty ratio of one of the first and second switching signals is varied and a duty ratio of the other thereof is set to 0.5.

The fourth modulation method means a phase shift modulation (PSM) method.

The PSM method is a method in which duty ratios of the first and second switching signals are set to 0.5 and only phases thereof are shifted.

Meanwhile, setting the duty ratio to 0.5 means that an ON duty and an OFF duty are ½, respectively, and this means that the ON duty and the OFF duty are the same as each other during one cycle.

At this point, the control unit 130 selects one of the multiple modulation methods based on an output electric power P, and then controls to output the first switching signal and the second switching signal according to the selected modulation method.

For this purpose, the control unit 130 firstly verifies an operational condition (a step up condition or a step down condition) of the electric power conversion apparatus based on an input voltage and an output voltage thereof.

In other words, the control unit 130 determines that the electric power conversion apparatus performs a step-up operation if a ratio between the input voltage and the output voltage is greater than 1, and determines that the electric power conversion apparatus performs a step-down operation if the ratio between the input voltage and the output voltage is equal to or less than 1.

And, the control unit 130 determines a modulation method using a currently required electric power condition according to the operational condition.

When a modulation method is determined, the control unit 130 generates a first switching signal and a second switching signal according to the determined modulation method, the determined control variable, and the operation direction of the electric power conversion apparatus, and then supplies the first switching signal and the second switching signal to the primary side circuit and the secondary side circuit, respectively.

Hereinafter, the operation of the control unit 130 will be described in more detail.

With reference to FIG. 14, the control unit 130 includes a controller 131, a mode selector 132, and a control signal output unit 133.

The control unit 130 generates the first and second switching signals for controlling the first and second converters using one modulation method corresponding to an output electric power value among the multiple different modulation methods.

In FIG. 14, $V_i$, means an input voltage, d means an input/output voltage ratio, $\Phi_f$ means an output signal of the controller 131, M means a modulation method select signal, $S_\alpha$ means the first switching signal, $S_\beta$ means the second switching signal, $\Phi$ means phase delay signals of the first and second switching signals, and Dir means an output electric power flow signal (e.g., an operation direction signal).

As described above, the control unit 130 basically uses a proportional integral controller (PI controller) so as to output the first and second switching signals.

The controller 131 includes a first calculator 1311, a second calculator 1312, a third calculator 1313, and a PI controller.

The first calculator 1311 receives a voltage instruction value $V_{ref}$ and an output voltage value $V_o$ to calculate and output a difference value therebetween.

The PI controller performs a proportional integral control on the difference value between the voltage instruction value $V_{ref}$ and the output voltage value $V_o$ to output a control variable $\Phi_f$. The control variable $\Phi_f$ is used for setting the output voltage value $V_0$ to the voltage instruction value $V_{ref}$, and may be determined according to a phase difference between the first switching signal and the second switching signal, and duty ratios of the first switching signal and the second switching signal.

The second calculator 1312 receives the output voltage value $V_o$ and an input voltage value $V_i$, to calculate and output a ratio therebetween.

That is, the second calculator 1312 calculates the output voltage value $V_o$/the input voltage value $V_i$, to output an input/output voltage ratio d.

The third calculator 1313 receives the output voltage value $V_o$ and an output current value $I_o$ to calculate and output a product of the output voltage value $V_o$ and the output current value $I_o$.

That is, the third calculator 1313 calculates and outputs an output electric power value $P_o$.

The calculation value of the second calculator 1312 and the calculation value of the third calculator 1313 are input to the mode selector 132.

The mode selector 132 receives the input/output voltage ratio d and the output electric power value $P_o$ to determine a modulation method for generating the first switching signal and the second switching signal.

Here, the mode selector 132 firstly verifies that the electric power conversion apparatus operates under a step-down condition or a step-up condition according to the input/output voltage ratio d.

And, if the operation condition of the electric power conversion apparatus is verified according to the input/output voltage ratio d, the mode selector 132 verifies that the output electric power value $P_o$ is included in an electric power range of which one of the multiple modulation methods based on an electric power reference value of each of the multiple modulation methods according to the verified operation condition.

Here, the mode selector 132 determines a modulation method based on the electric power reference value of each of the multiple modulation methods to which a different electric power reference value is applied according to the operation condition.

In other words, the electric power reference value includes a first electric power reference value regarding the first modulation method, a second electric power reference value regarding the second modulation method, a third electric power reference value regarding the third modulation method, and a fourth electric power reference value regarding the fourth modulation method.

Here, each of the electric power reference values may be a specific value, and otherwise, may mean a range of an electric power which is covered by each of the multiple modulation methods.

At this point, a value of an electric power as a reference is varied according to variation of the input/output voltage ratio. Consequently, the modulation method may be selected by applying a different electric power range according to the input/output voltage ratio d.

Here, the electric power reference value with respect to each of the multiple modulation methods, that is, a range of an electric power value may be determined by Table 1 as follow.

TABLE 1

| Modulation Method | Range of Electric Power Value |
|---|---|
| First Modulation Method | 0 to 0.7 kW |
| Second Modulation Method | 0.7 to 1.8 kW |
| Third Modulation Method | 1.8 to 3.3 kW |
| Fourth Modulation Method | over 3.3 kW |

With reference to Table 1, each of the multiple modulation methods may cover a different range of the electric power value. The first modulation method may make maximum efficiency in a lowest range of the electric power value, and then the second modulation method, the third modulation method, and the fourth modulation method sequentially make maximum efficiency as the electric power value is increased.

Consequently, the mode selector 132 selects one of the multiple modulation methods and outputs a select signal M regarding the selected modulation method to the control signal output unit 133.

For example, if the output electric power value $P_o$ is 0.5 kW, the mode selector 132 outputs a select signal of the first modulation method to the control signal output unit 133. Also, if the output electric power value $P_o$ is 1.5 kW, the mode selector 132 outputs a select signal of the second modulation method to the control signal output unit 133. In addition, if the output electric power value $P_o$ is 2.5 kW, the mode selector 132 outputs a select signal of the third modulation method to the control signal output unit 133. And, if the output electric power value $P_o$ is 5 kW, the mode selector 132 outputs a select signal of the fourth modulation method to the control signal output unit 133.

Meanwhile, although it has been described that a single range of the electric power value exists according to each of the multiple modulation methods as shown in Table 1, it may be merely one embodiment, and different ranges of the electric power values may exist according to an operation condition (a step-down condition or a step-up condition) of the electric power conversion apparatus.

The control signal output unit 133 receives a control variable $\Phi_f$ output from the controller 131, the select signal M, and an operation direction signal Dir.

And, using the control variable $\Phi_f$, the select signal M, and the operation direction signal Dir, the control signal output unit 133 generates and outputs a first switching signal and a second switching signal by applying a modulation method corresponding to the select signal M.

At this point, generating the first switching signal and the second switching signal corresponding to the modulation method by using the same is well known in the related art, so that a detailed description thereof will be omitted.

As described above, the control unit 130 according to the present disclosure selects the modulation method for generating the first switching signal and the second switching signal based on the output electric power value $P_o$ and the input/output voltage ratio d, and generate and outputs the first switching signal and the second switching signal according to the selected modulation method.

Meanwhile, when receiving the select signal M, the control signal output unit 133 verifies whether or not the currently selected modulation method is different to a previously selected modulation method.

And, if the current modulation method is different to the previous modulation method, the control signal output unit 133 changes the received control variable $\Phi_f$. The control variable $\Phi_f$ may be increased or decreased according to the operation condition of the electric power conversion apparatus.

In other words, each of the multiple modulation methods outputs an output current and an output voltage different to those of the other modulation methods when being compared thereto.

As a result, if the modulation method is abruptly changed, a phenomenon in which the output current and the output voltage are suddenly increased may occur so that this may have a great effect on reliability of the electric power conversion apparatus.

Therefore, when the modulation method is changed, without generating an output current and an output voltage corresponding to a current control variable, the control signal output unit 133 changes the current control variable with a control variable for generating an output current included between an output current corresponding to a previous control variable and an output current corresponding to the current control variable, or a control variable for generating an output voltage included between an output voltage corresponding to the previous control variable and an output voltage corresponding to the current control variable on the basis of output currents and output voltages of the previous control variable and the current variable, and generates and outputs the first switching signal and the second switching signal according to the changed control variable.

In accordance with the embodiment of the present disclosure, a modulation method of a switching signal is changed according to an output electric power value such that a problem caused by a typical complicated closed-loop control method may be addressed, an electric power delivery in a wider voltage range may be possible, and high electric power conversion efficiency may be obtained over a wide voltage range.

Also, in accordance with the embodiment of the present disclosure, when a modulation method of a switching signal is changed according to variation of an output electric power value, a control variable is also changed according to the change of the modulation method such that a problem in which values of an output voltage and an output current are abruptly changed according to the change of the modulation method may be addressed.

Modulation Method

Hereinafter, each modulation method included in the present disclosure will be described.

Figure 15:
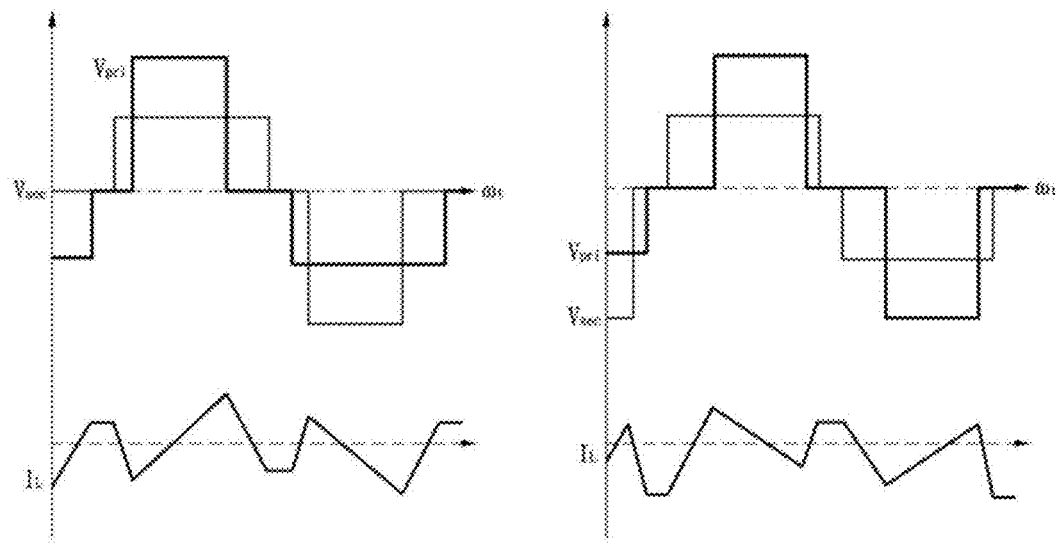
FIG. 15 is a diagram for describing a first modulation method according to an embodiment of the present disclosure.
Figure 16:
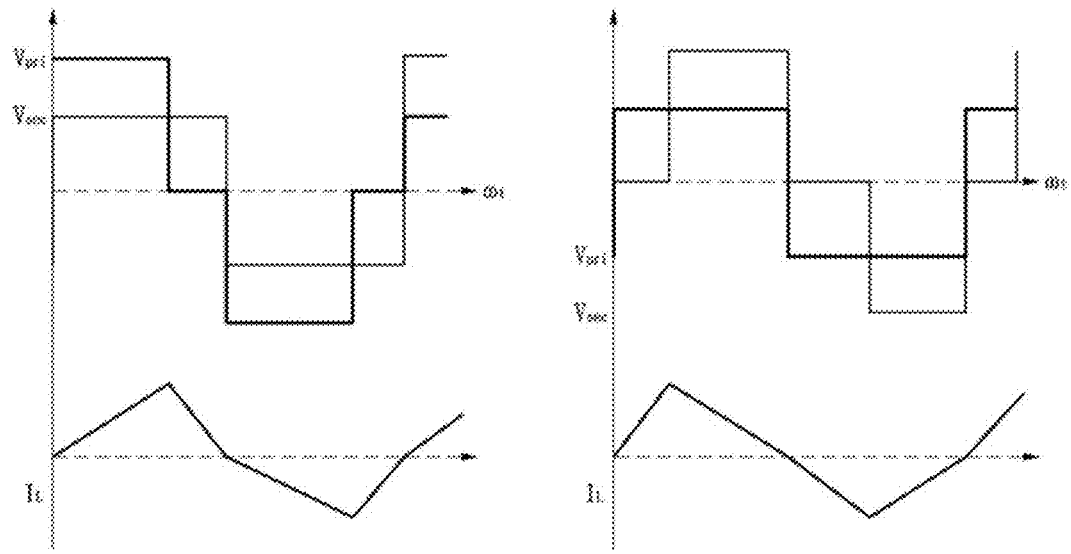
FIG. 16 is a diagram for describing a second modulation method according to an embodiment of the present disclosure.
Figure 17:
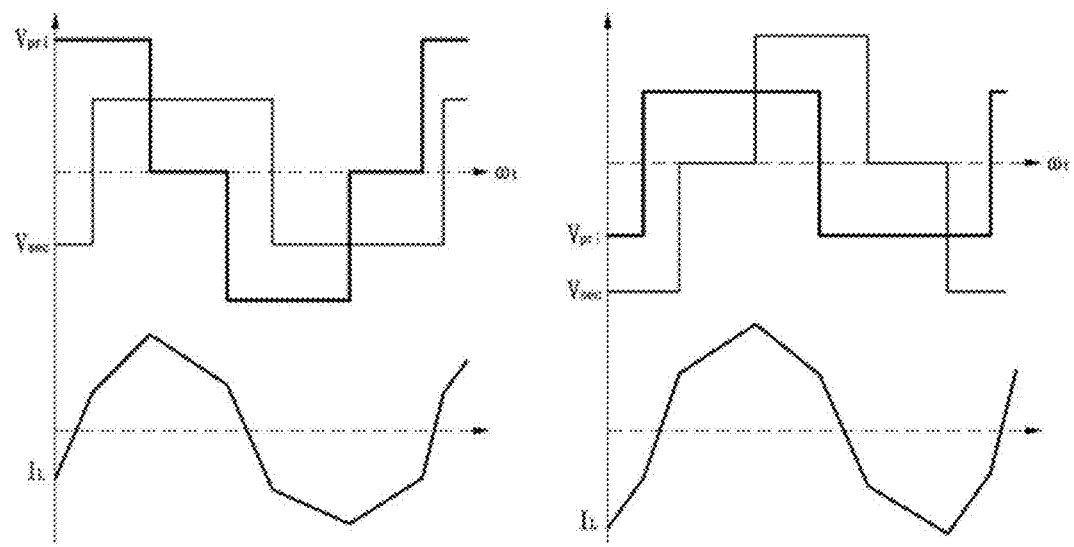
FIG. 17 is a diagram for describing a third modulation method according to an embodiment of the present disclosure.
Figure 18:
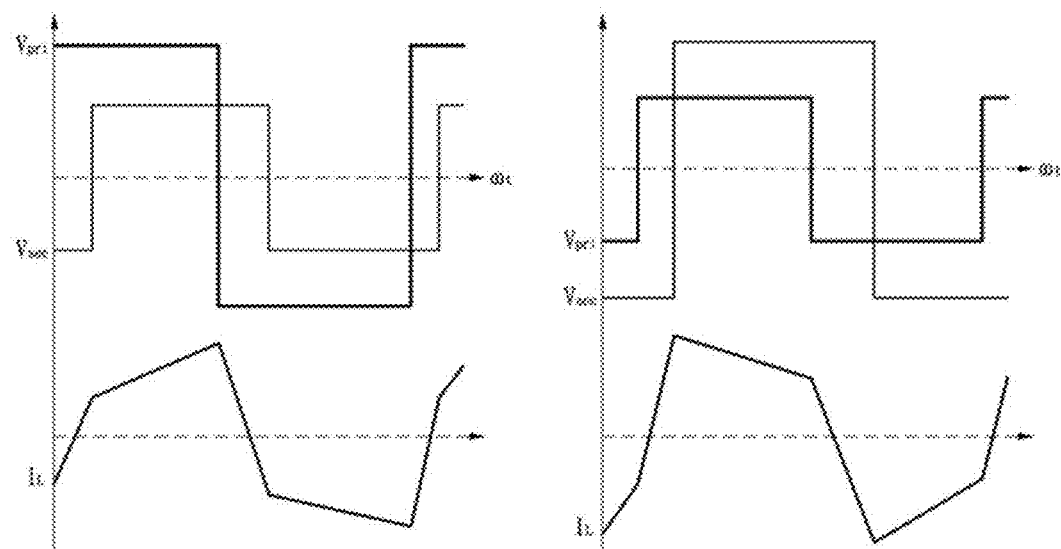
FIG. 18 is a diagram for describing a fourth modulation method according to an embodiment of the present disclosure.

FIG. 15 is a diagram for describing the first modulation method according to the embodiment of the present disclosure, FIG. 16 is a diagram for describing the second modulation method according to the embodiment of the present disclosure, FIG. 17 is a diagram for describing the third modulation method according to the embodiment of the present disclosure, and FIG. 18 is a diagram for describing the fourth modulation method according to the embodiment of the present disclosure.

In FIGS. 15 to 18, $V_{pri}$ means a primary side voltage value of the transformer $L_p$ and $L_s$, $V_{sec}$ means a secondary side voltage value of the transformer $L_p$ and $L_s$ and $I_L$ means an output current according to the primary side voltage value and the secondary side voltage value.

And, in FIGS. 15 to 18, waveforms at a left side represent output waveforms under a step-down condition in each modulation method, whereas waveforms at a right side represent output waveforms under a step-up condition in each modulation method.

With reference to FIGS. 15 to 18, it can be seen that an output current of the first modulation method is lowest and an output current is gradually increased in the order of the second modulation method, the third modulation method, and the fourth modulation method.

Therefore, when an output electric power value Po is low, a voltage modulation may be performed using the first modulation method including the lowest output current as described above to obtain maximum electric power conversion efficiency. And, it can be seen that an output current is increased as a modulation method is changed in the order of the second modulation method, the third modulation method, and the fourth modulation method, such that it may be preferable to change the modulation method generating an output current corresponding to the output electric power value Po as it is increasing.

With reference to FIG. 15, the first modulation method means a dual PWM method.

The dual PWM method is a method in which the first and second switching signals are modulated by applying a PWM method. That is, as shown in FIG. 15, duty ratios of the primary side voltage and the secondary side voltage are the same as each other. Therefore, the duty ratios of the first switching signal and the second switching signal are varied instead of being fixed.

With reference to FIG. 16, the second modulation method means a triangular PWM method.

The triangular PWM method is a method in which a duty ratio of one of the first and second switching signals is varied and a duty ratio of the other thereof is set to 0.5. This is a modulation method in which a current becomes 0 at a time when a voltage waveform of the transformer $L_p$ and $L_s$ is changed (from a positive to a negative, or from a negative to a positive). That is, as shown in FIG. 16, it can be seen that a duty ratio of the primary side voltage value is continuously varied whereas a duty ratio of the secondary side voltage value is fixed. And, the current has a value of zero at a time when a voltage waveform of the transformer $L_p$ and $L_s$ is changed.

With reference to FIG. 17, the third modulation method means a single PWM method.

Similar to the triangular PWM method, the single PWM method is a method in which a duty ratio of one of the first and second switching signals is varied whereas a duty ratio of the other thereof is set to 0.5.

With reference to FIG. 18, the fourth modulation method means a phase shift modulation (PSM) method.

The PSM method is a method in which duty ratios of the first and second switching signals are set to 0.5 and only phases thereof are shifted.

Operating Method of Electric Power Conversion Apparatus

Hereinafter, an operating method of the electric power conversion apparatus will be described.

Figure 19:
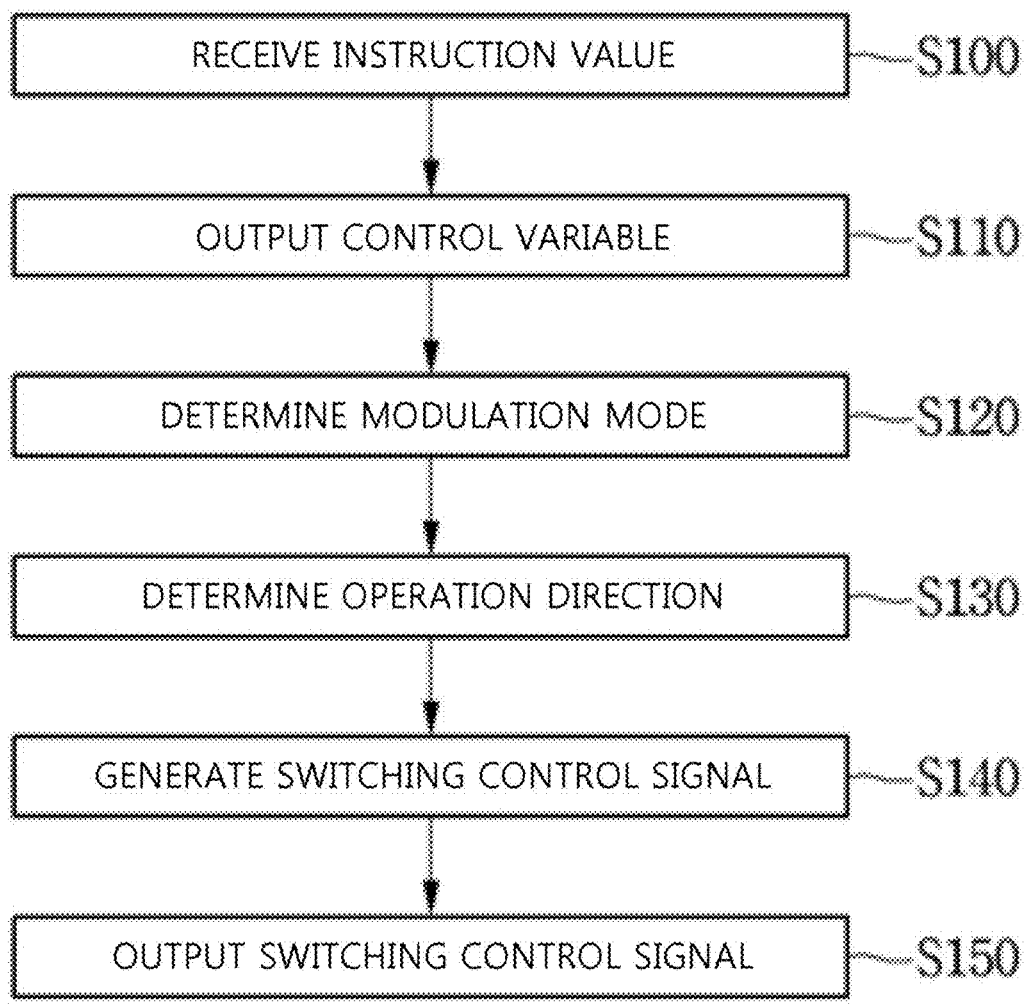
FIG. 19 is a flowchart for describing in step-by-step an operating method of the electric power conversion apparatus according to an embodiment of the present disclosure.
Figure 20:
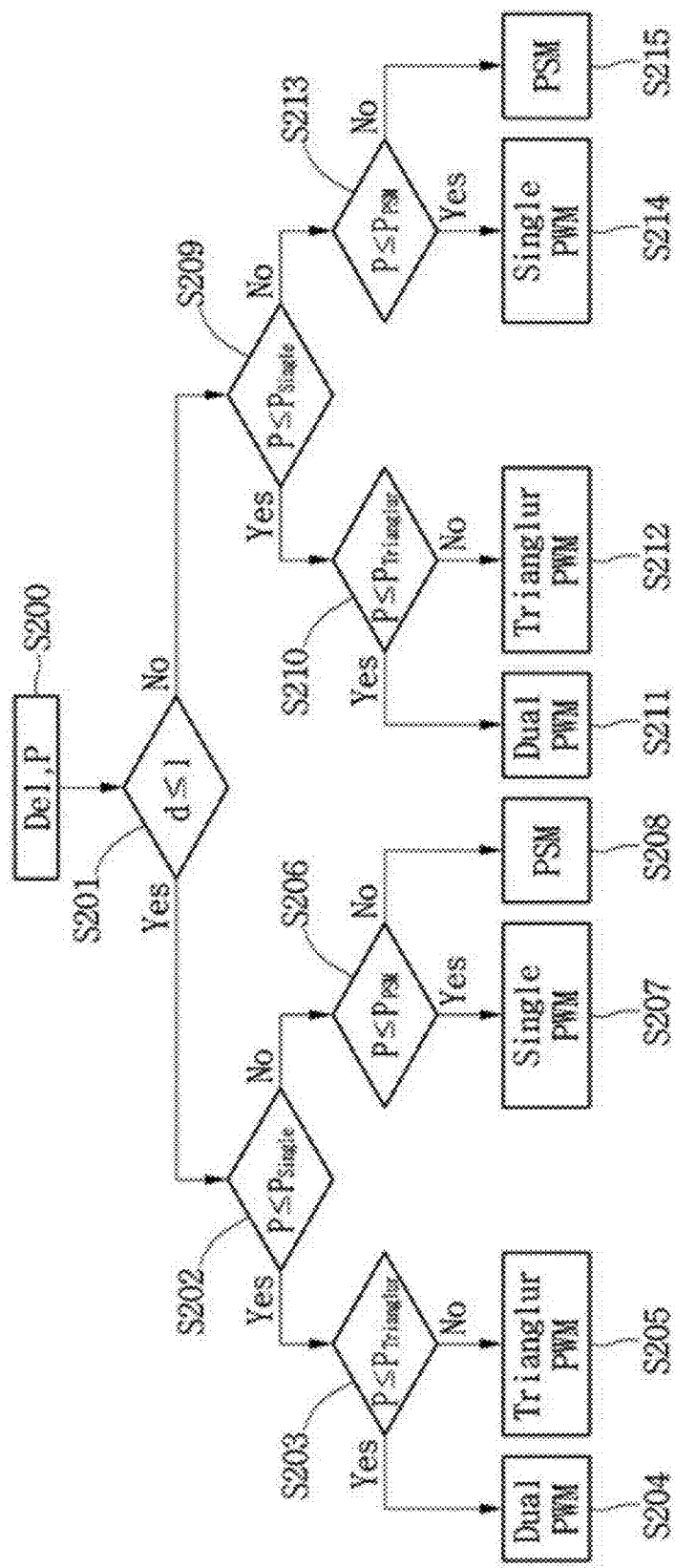
FIG. 20 is a flowchart for describing in detail a process of determining a modulation mode in FIG. 19, according to an embodiment of the present disclosure.
Figure 21:
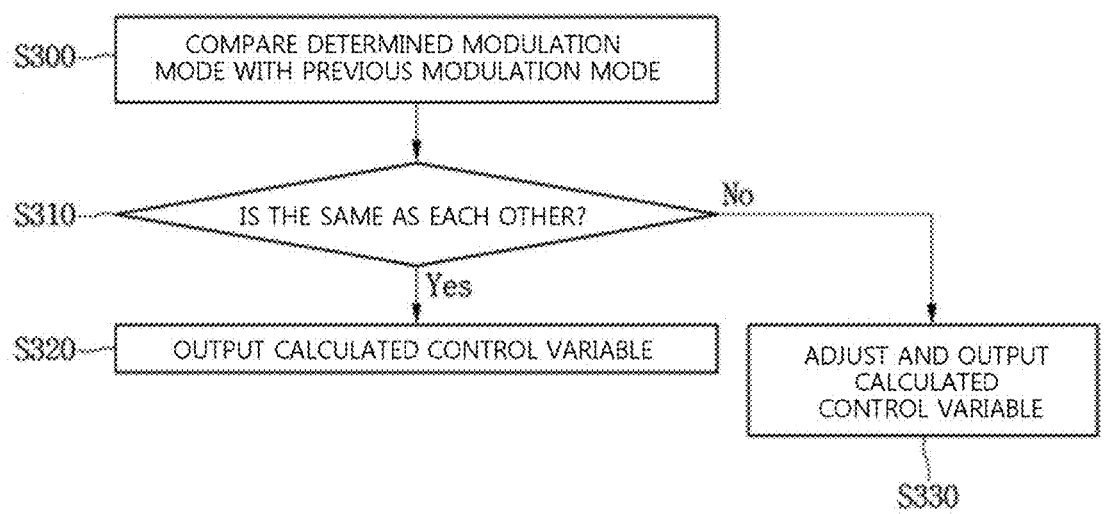
FIG. 21 is a flowchart for describing a method of changing a modulation mode according to an embodiment of the present disclosure.

FIG. 19 is a flowchart for describing in step-by-step an operating method of the electric power conversion apparatus according to the embodiment of the present disclosure, FIG. 20 is a flowchart for describing in detail a process of determining a modulation mode in FIG. 19, and FIG. 21 is a flowchart for describing a method of changing a modulation mode according to the embodiment of the present disclosure.

With reference to FIG. 19, the control unit 130 receives an instruction value in Operation S100. The instruction value may be a voltage instruction value $V_{ref}$ or an electric power instruction value $P_{ref}$.

When receiving the instruction value, the controller 130 outputs a control variable based on the instruction value in Operation S110. The control variable is a result value obtained by performing a proportional integral on a difference value between the voltage instruction value and an actually measured voltage value (an output voltage value).

Thereafter, the control unit 130 calculates an input/output voltage ratio d and an output electric power value $P_o$ and determines a modulation mode (a modulation method) by using the calculated input/output voltage ratio d and the calculated output electric power value $P_o$ in Operation S120. A detailed process of determining the modulation method will be described later.

And, the control unit 130 determines an operation direction of the electric power conversion apparatus according to a condition thereof in Operation S130.

Next, the control unit 130 generates a switching control signal using the selected modulation method according to the determined control variable and the determined operation direction in Operation S140. That is, the control unit 130 generates a first switching signal and a second switching signal based on the selected modulation method.

Afterward, the control unit 130 transmits the generated first switching signal and the generated second switching signal to the switching elements of the primary side circuit and the secondary side circuit, respectively. The first switching signal and the second switching signal are a gate signal input to gates of the switching elements.

And, with reference to FIG. 20, the mode selector 132 receives the control variable and the output electric power value $P_o$ in Operation S200.

Thereafter, the mode selector 132 receives the input/output voltage ratio d and verifies whether or not the received input/output voltage ratio d is equal to or less than 1 to determine whether the electric power conversion apparatus operates under a step-down condition or under a step-up condition in Operation S201.

As the determination result, if the electric power conversion apparatus operates under the step-down condition (d≤1), the mode selector 132 determines whether or not the output electric power value $P_o$ is equal to or less than an electric power value ($P_{single}$) in a range of an electric power value of the third modulation method in Operation S202.

And, if the output electric power value $P_o$ is equal to or less than the electric power value in the range of the electric power value of the third modulation method, the mode selector 132 determines whether or not the output electric power value $P_o$ is equal to or less than an electric power value ($P_{triangular}$) triangular) in a range of an electric power value of the second modulation method in Operation S203.

And then, if the output electric power value $P_o$ is equal to or less than the electric power value in the range of the electric power value of the second modulation method, the mode selector 132 selects the first modulation method to output a select signal of the first modulation method in Operation S204.

If the output electric power value $P_o$ is greater than the electric power value in the range of the electric power value of the second modulation method, the mode selector 132 selects the second modulation method to output a select signal of the second modulation method in Operation S205.

Also, if the output electric power value $P_o$ is greater than the electric power value in the range of the electric power value of the third modulation method, the mode selector 132 determines whether or not the output electric power value $P_o$ is equal to or less than an electric power value $P_{psm}$ in a range of an electric power value of the fourth modulation method in Operation S206.

And, if the output electric power value $P_o$ is equal to or less than the electric power value in the range of the electric power value of the fourth modulation method, the mode selector 132 selects the third modulation method to output a select signal of the third modulation method in Operation S207.

In addition, if the output electric power value $P_o$ is greater than the electric power value in the range of the electric power value of the fourth modulation method, the mode selector 132 selects the fourth modulation method to output a select signal of the fourth modulation method in Operation S208.

Here, the electric power value $P_{triangular}$ in the range of the electric power value of the second modulation means a minimum value in the range thereof, the electric power value $P_{single}$ in the range of the electric power value of the third modulation means a minimum value in the range thereof, and the electric power value $P_{psm}$ in the range of the electric power value of the fourth modulation means a minimum value in the range thereof.

Meanwhile, as the determination result, if the electric power conversion apparatus operates under the step-up condition (d>1), the mode selector 132 determines whether or not the output electric power value $P_o$ is equal to or less than the electric power value $P_{single}$ in the range of the electric power value of the third modulation method in Operation S209.

If the output electric power value $P_o$ is equal to or less than the electric power value in the range of the electric power value of the third modulation method, the mode selector 132 determines whether or not the output electric power value Po is equal to or less than the electric power value $P_{triangular}$ in the range of the electric power value of the second modulation method in Operation S210.

And, if the output electric power value $P_o$ is equal to or less than the electric power value in the range of the electric power value of the second modulation method, the mode selector 132 selects the first modulation method to output a select signal of the first modulation method in Operation S211.

Then, if the output electric power value $P_o$ is greater than the electric power value in the range of the electric power value of the second modulation method, the mode selector 132 selects the second modulation method to output a select signal of the second modulation method in Operation S212.

Also, if the output electric power value $P_o$ is greater than the electric power value in the range of the electric power value of the third modulation method, the mode selector 132 determines whether or not the output electric power value Po is equal to or less than the electric power value $P_{psm}$ in the range of the electric power value of the fourth modulation method in Operation S213.

And, if the output electric power value $P_o$ is equal to or less than the electric power value in the range of the electric power value of the fourth modulation method, the mode selector 132 selects the third modulation method to output a select signal of the third modulation method in Operation S214.

Also, if the output electric power value $P_o$ is greater than the electric power value in the range of the electric power value of the fourth modulation method, the mode selector 132 selects the fourth modulation method to output a select signal of the fourth modulation method in Operation S215.

Here, the electric power value $P_{triangular}$ in the range of the electric power value of the second modulation means a minimum value in the range thereof, the electric power value $P_{single}$ in the range of the electric power value of the third modulation means a minimum value in the range thereof, and the electric power value $P_{psm}$ in the range of the electric power value of the fourth modulation means a minimum value in the range thereof.

Also, with reference to FIG. 21, the control unit 130 compares the determined modulation method with a previous modulation method in Operation S300.

Thereafter, if the determined modulation method and the previous modulation method are the same as each other, the control unit 130 outputs the first switching signal and the second switching signal based on the calculated control variable in Operation S320.

Also, if the determined modulation method and the previous modulation method are different to each other, the control unit 130 adjusts the calculated control variable so as to address abrupt changes of an output current and an output voltage and outputs the first switching signal and the second switching signal based on the adjusted control variable in Operation S330.

In accordance with the embodiment of the present disclosure, by changing a modulation method of a switching signal according to an output electric power value, a problem caused by a typical complicated closed-loop control method may be addressed, an electric power delivery may be possible in a wider voltage range, and also a high electric power conversion efficiency may be obtained in a wide voltage range.

Also, in accordance with the embodiment of the present disclosure, when a modulation method of a switching signal is changed according to variation of an output electric power value, a control variable is changed in correspondence to the change of the modulation method such that a problem in which the output voltage and the output current are abruptly changed according to the change of the modulation method may be addressed.

Meanwhile, in accordance with another embodiment of the present disclosure, the modulation mode for generating control signals of the first and second converters is selected according to the output electric power value and the operation direction, such that ranges of an electric power to be deliverable may be wider and an electric power conversion efficiency at each electric power range may be improved.

The features, structures, effects and the like described in connection with the embodiments may be included in at least one embodiment of the present disclosure, and these are not limited to one embodiment. Further, illustrative features, structures, effects and the like in each embodiment may be combined or modified in any suitable manner in one or more embodiments by those skilled in the art. Therefore, these combination and modification should be construed that will fall within the scope of the embodiment.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. For instance, each component shown in the embodiment may be implemented by a modified form. Differences related to such modification and application may be construed to be included in the range of embodiments defined in the appended claims.

What is claimed is:

1. An electric power conversion apparatus, comprising:
   a transformer;
   a first converter connected to a primary side of the transformer;
   a second converter connected to a secondary side of the transformer;
   a first capacitor connected to the first converter;
   a second capacitor connected to the second converter; and
   a control unit configured to control the first converter and the second converter,
   wherein the control unit comprises:
   a controller configured to output a control variable corresponding to a voltage instruction value;
   a mode selector configured to output a select signal of one modulation method among the plurality of modulation methods based on an output electric power value; and
   a control signal output unit configured to output a first switching signal for controlling the first converter and a second switching signal for controlling the second converter by applying the modulation method selected through the mode selector based on the control variable output through the controller.

2. The electric power conversion apparatus of claim 1, wherein the first converter comprises first and second switching elements of a first leg and third and fourth switching elements of a second leg, and the second converter comprises fifth and sixth switching elements of a third leg and seventh and eighth switching elements of a fourth leg.

3. The electric power conversion apparatus of claim 1, wherein the first converter comprises first and second legs and the second converter comprises third and fourth legs, and wherein the first leg comprises:
a first switching element group including first and second switching elements connected in parallel with each other; and
a second switching element group including third and fourth switching elements connected in parallel with each other, wherein the second leg comprises:
a third switching element group including fifth and sixth switching elements connected in parallel with each other; and
a fourth switching element group including seventh and eighth switching elements connected in parallel with each other, wherein the third leg comprises:
a fifth switching element group including ninth and tenth switching elements connected in parallel with each other; and
a sixth switching element group including eleventh and twelfth switching elements connected in parallel with each other, and wherein the fourth leg comprises:
a seventh switching element group including thirteenth and fourteenth switching elements connected in parallel with each other; and
an eighth switching element group including fifteenth and sixteenth switching elements connected in parallel with each other.

4. The electric power conversion apparatus of claim 1, wherein the controller comprises:
a first calculator configured to output a difference value between the voltage instruction value and an output voltage value;
a proportional integral controller configured to perform a proportional integral on an output value of the first calculator to output the control variable; and
a second calculator configured to output the output electric power value according to a product of the output voltage value and an output current value.

5. The electric power conversion apparatus of claim 4, wherein the controller further comprises a third calculator configured to receive an input voltage value and the output voltage value to calculate and output an input/output voltage ratio, and wherein the mode selector selects a modulation method based on an operation condition according to the input/output voltage ratio output through the third calculator, and based on the output electric power value.

6. The electric power conversion apparatus of claim 5, wherein the modulation method comprises:
a first modulation method corresponding to a dual pulse width modulation method;
a second modulation method corresponding to a triangular pulse width modulation method;
a third modulation method corresponding to a single pulse width modulation method; and
a fourth modulation method corresponding to a phase shift modulation (PSM) method, wherein the mode selector stores an operation range corresponding to each of the modulation methods, verifies a modulation method in which the output electric power is included based on the stored operation range, and outputs a select signal of the verified modulation method.

7. The electric power conversion apparatus of claim 6, wherein:
the electrical power value included in the operational range of the first modulation method is less than that of the second modulation method;
the electrical power value included in the operational range of the second modulation method is less than that of the third modulation method; and
the electrical power value included in the operational range of the third modulation method is less than that of the fourth modulation method.

8. The electric power conversion apparatus of claim 6, wherein the operation condition comprises:
a step-up condition in which an output voltage is greater than an input voltage; and
a step-down condition in which the output voltage is equal to or less than the input voltage, wherein the mode selector separately stores an operation range in the step-up condition and an operation range in the step-down condition by corresponding to each of the modulation methods.

9. The electric power conversion apparatus of claim 6, wherein the control signal output unit is further configured to receive operation direction information of the electric power conversion apparatus, and to output the first switching signal and the second switching signal using the received operation direction information, and wherein the operation direction information comprises:
a first direction operation condition in which a voltage is output from the first converter to the second converter; and
a second direction operation condition in which the voltage is output from the second converter to the first converter.

10. The electric power conversion apparatus of claim 6, wherein the control signal output unit is further configured to compare a currently selected modulation method with a previously applied modulation method, and to adjust the received control variable if the current modulation method and the previous modulation method are different to each other.

11. A method of operating an electric power conversion apparatus, which comprises a transformer, a first converter connected to a primary side of the transformer and including a plurality of switching elements of a first leg and a plurality of switching elements of a second leg, and a second converter connected to a secondary side of the transformer and including a plurality of switching elements of a third leg and a plurality of switching elements of a fourth leg, comprising:
calculating an output electric power value using an output voltage value and an output current value of the electric power conversion apparatus;
determining whether an operation condition of the electric power conversion apparatus is a step-down condition or a step-up condition using an input voltage value and the output voltage value of the electric power conversion apparatus;
selecting a modulation method in which the output electric power value is included based on operation ranges of a plurality of modulation methods, each of which is classified according to the operation condition;

performing a proportional integral on a difference value between a voltage instruction value and the output voltage value to output a control variable; and outputting a first switching signal of the first converter and a second switching signal of the second converter, which correspond to the output control variable, by applying the selected modulation method, wherein the modulation method comprises:
- a first modulation method corresponding to a dual pulse width modulation method;
- a second modulation method corresponding to a triangular pulse width modulation method;
- a third modulation method corresponding to a single pulse width modulation method; and
- a fourth modulation method corresponding to a phase shift modulation (PSM) method, wherein the electric power value included in the operation range of each of the modulation methods has a magnitude condition as follows:
- the first modulation method<the second modulation method<the third modulation method<the fourth modulation method.

12. The method of claim 11, further comprising:
determining whether an operation direction condition of the electric power apparatus is a first direction operation condition or a second direction operation direction, wherein the first direction operation condition is a condition in which a voltage is output from the first converter to the second converter, and the second direction operation condition is a condition in which the voltage is output from the second converter to the first converter, wherein the outputting of the first switching signal of the first converter and the second switching signal of the second converter comprises outputting the first and second switching signals to the first converter and the second converter according to the determined operation condition.

13. The method of claim 11, further comprising:
comparing a currently selected modulation method with a previously applied modulation method prior to the outputting of the first and second switching signals; and
adjusting the received control variable if the current modulation method and the previous modulation method are different to each other.

* * * * *